(12) United States Patent
Wagner et al.

(10) Patent No.: US 12,540,121 B2
(45) Date of Patent: Feb. 3, 2026

(54) COMPOSITIONS COMPRISING A RETINOID X RECEPTOR (RXR) AGONIST, A RETINOIC ACID RECEPTOR (RAR) AGONIST, OR A DUAL RXR/RAR AGONIST

(71) Applicant: Arizona Board of Regents on behalf of Arizona State University, Scottsdale, AZ (US)

(72) Inventors: Carl Wagner, Glendale, AZ (US); Pamela Marshall, Peoria, AZ (US); Peter Jurutka, Scottsdale, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 903 days.

(21) Appl. No.: 17/622,915

(22) PCT Filed: Jun. 24, 2020

(86) PCT No.: PCT/US2020/039337
§ 371 (c)(1),
(2) Date: Dec. 27, 2021

(87) PCT Pub. No.: WO2020/263960
PCT Pub. Date: Dec. 30, 2020

(65) Prior Publication Data
US 2022/0259157 A1 Aug. 18, 2022

Related U.S. Application Data

(60) Provisional application No. 62/868,088, filed on Jun. 28, 2019.

(51) Int. Cl.
*C07D 241/12* (2006.01)
*A61K 31/4985* (2006.01)
*C07C 229/60* (2006.01)
*C07D 213/80* (2006.01)
*C07D 239/42* (2006.01)
*C07D 241/14* (2006.01)

(52) U.S. Cl.
CPC .......... *C07D 239/42* (2013.01); *C07C 229/60* (2013.01); *C07D 213/80* (2013.01)

(58) Field of Classification Search
CPC . C07D 241/12; C07D 241/14; A61K 31/4985
See application file for complete search history.

(56) References Cited

U.S. PATENT DOCUMENTS

| | | | | |
|---|---|---|---|---|
| 5,525,618 A * | 6/1996 | Shudo | ................. | A61K 31/196 514/352 |
| 6,162,815 A | 12/2000 | Bernardon | | |
| 6,610,744 B2 | 8/2003 | Teng | | |
| 2007/0060566 A1 * | 3/2007 | Bailey | ................. | C07D 409/12 540/592 |
| 2010/0286427 A1 | 11/2010 | Muratake | | |
| 2011/0172234 A1 * | 7/2011 | Srivastava | ............. | A61K 31/41 514/263.33 |
| 2012/0149737 A1 | 6/2012 | Corcoran et al. | | |
| 2012/0309833 A1 | 12/2012 | Wagner | | |
| 2014/0343079 A1 | 11/2014 | Wagner | | |
| 2015/0119582 A1 | 4/2015 | Wagner | | |
| 2016/0338981 A1 | 11/2016 | Marshall | | |
| 2017/0008859 A1 | 1/2017 | Wagner | | |
| 2017/0072010 A1 | 3/2017 | Gudas | | |
| 2018/0072697 A1 | 3/2018 | Wagner | | |
| 2018/0207125 A1 | 7/2018 | Wagner | | |
| 2018/0207126 A1 | 7/2018 | Wagner | | |
| 2018/0207156 A1 | 7/2018 | Wagner | | |
| 2019/0218190 A1 | 7/2019 | Wagner | | |

OTHER PUBLICATIONS

Shiroya et al. Bailey et al. (Medicinal Chemistry Research (2013), 22(11), 5227-5235).*
Hashimoto et al. (Xenobiotica (1994), 24(12), 1177-93). Abstract (1994).*
K Ohta, E Kawachi, N Inoue, H Fukasawa, Y Hashimoto, A Itai, H Kagechika, Chem Pharm Bull (Tokyo) . Oct. 2000; 48(10):1504-13.
Takamatsu, K. et al., Reduction of Lipophilicity at the Lipophilic Domain of RXR Agonists Enables Production of Subtype Preference: RXRα-Preferential Agonist Possessing a Sulfonamide Moiety, ChemMedChem., 2008, 3:454-460.
Fukusawa, H.; Nakagomi, M.; Yamagata, N.; Katsuki, H.; Kawahara, K.; Kitaoka, K.; Miki, T.; Shudo, K. "Tamibarotene: a candidate retinoid drug for Alzheimer's disease" Biological & Pharmaceutical Bulletin 2012, 35(8), 1206-1212.
Kagechika, H.; Kawachi, E.; Hashimoto, Y.; Shudo, K.; Himi, T. "Retinobenzoic acids. Structure-activity relationships of aromatic amides with retinoidal activity" J. Med. Chem. 1988, 31(11), 2182-2192.
Miwako, I.; Kagechika, H. "Tamibarotene" Drugs Today (Barc) 2007, 43(8), 563-568.
Ohta, K.; Kawachi, E.; Fukusawa, H.; Shudo, K.; Kagechika, H. "Diphenylamine-based retinoid antagonists: Regulation of RAR and RXR function depending on the N-substituent" Bioorganic & Medicinal Chemistry 2011, 19, 2501-2507.

* cited by examiner

*Primary Examiner* — Bruck Kifle
(74) *Attorney, Agent, or Firm* — Riverside Law LLP

(57) ABSTRACT

The present invention relates to compositions comprising an RXR agonist, an RAR agonist, or a dual RXR/RAR agonist. The present invention further relates to methods of using the agonist compositions for treating or preventing dementia and cancer. In some embodiments, the dementia comprises Alzheimer's disease. In some embodiments, the cancer comprises leukemia.

5 Claims, No Drawings

COMPOSITIONS COMPRISING A RETINOID X RECEPTOR (RXR) AGONIST, A RETINOIC ACID RECEPTOR (RAR) AGONIST, OR A DUAL RXR/RAR AGONIST

CROSS-REFERENCE TO RELATED APPLICATIONS

The present application is a 35 U.S.C. § 371 national phase application from, and claiming priority to, International Application No. PCT/US20/39337; filed Jun. 24, 2020, which claims priority under 35 U.S.C. § 119(e) to U.S. Provisional Application Ser. No. 62/868,088, filed on Jun. 28, 2019, each of which are hereby incorporated by reference in their entireties.

BACKGROUND OF THE INVENTION

There is a need in the art for compositions comprising a retinoid X receptor (RXR) agonist, a retinoic acid receptor (RAR) agonist, or a dual RXR/RAR agonist as well as methods of using these compositions to treat or prevent diseases and disorders. The present invention satisfies this unmet need.

SUMMARY OF THE INVENTION

In one aspect, the present invention relates to a compound of formula (1), or a pharmaceutically acceptable salt, solvate, hydrate or stereoisomer thereof

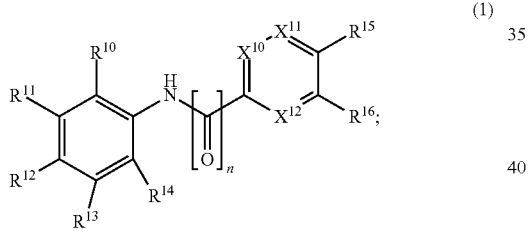

(1)

wherein $X^{10}$-$X^{12}$ are each independently N or $CR^{17}$; wherein $R^{10}$-$R^{17}$ are each independently selected from the group consisting of: hydrogen, deuterium, halogen, —OH, $CO_2R^{18}$, $(CR^{19}R^{110})_m$—O—$R^{111}$, —$C_1$-$C_6$ alkyl, —$C_3$-$C_6$ cycloalkyl, —$C_2$-$C_4$-alkynyl, —$C_2$-$C_4$-alkenyl, alkoxy, alkylthio, aryl, —$C_1$-$C_6$ heteroalkyl, —$C_3$-$C_6$ heterocycyl, —$C_3$-$C_6$ heteroaryl, amido, amino, cyano, and combinations thereof, wherein two adjacent $R^{10}$-$R^{14}$ can optionally fuse or join to form a ring which is optionally further substituted; wherein $R^{18}$, $R^{19}$, $R^{110}$, and $R^{111}$ are each independently hydrogen or —$C_1$-$C_6$ alkyl; wherein m is 0, 1, or 2; wherein n is 0 or 1; with the proviso that the compound of formula (1) is not a compound selected from the group consisting of:

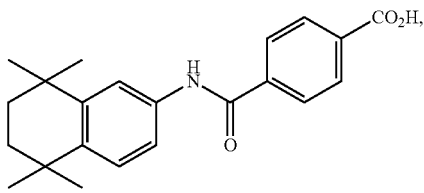

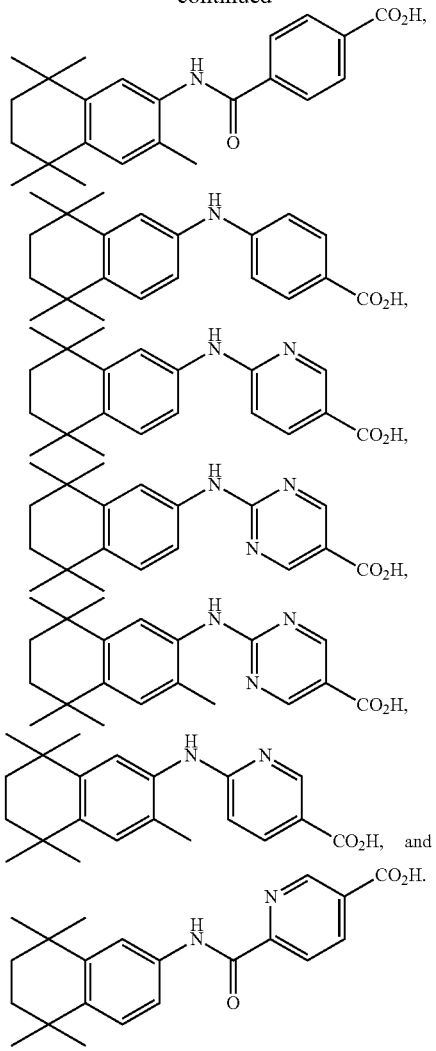

In one embodiment, the compound of formula (1) is a compound of formula (2), or a pharmaceutically acceptable salt, solvate, hydrate or stereoisomer thereof:

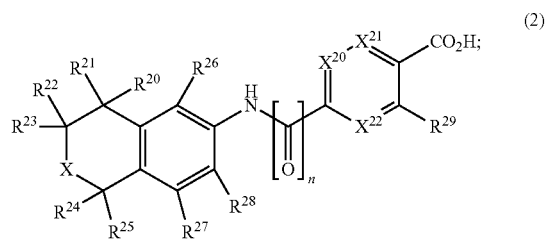

(2)

wherein $X^{20}$-$X^{22}$ are each independently N or $CR^{210}$, and at least one of $X^{20}$-$X^{22}$ is $CR^{210}$; wherein $R^{20}$-$R^{28}$ are each independently hydrogen or —$C_1$-$C_6$ alkyl; wherein $R^{29}$ and $R^{210}$ are each independently selected from the group consisting of: hydrogen, halogen, —OH, and —$CO_2H$; wherein X is O or CRR'; wherein R and R' are each independently hydrogen or —$C_1$-$C_6$ alkyl; and wherein n is 0 or 1. In one embodiment, $R^{20}$, $R^{21}$, $R^{24}$, and $R^{25}$ are each independently methyl. In one embodiment, X is O. In one embodiment, X is CRR' and wherein R and R' are each hydrogen. In one embodiment, the compound of formula (1) is a compound of formula (3), or a pharmaceutically acceptable salt, solvate, hydrate or stereoisomer thereof:

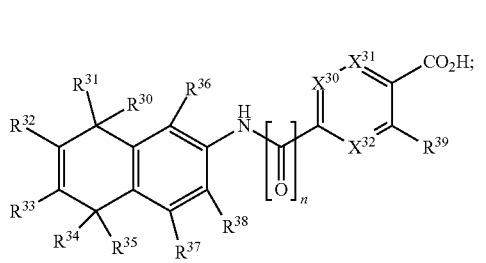

(3)

wherein $X^{30}$-$X^{32}$ are each independently N or $CR^{310}$, and at least one of $X^{30}$-$X^{32}$ is $CR^{310}$; wherein $R^{30}$-$R^{38}$ are each independently hydrogen or —$C_1$-$C_6$ alkyl; wherein $R^{39}$ and $R^{310}$ are each independently selected from the group consisting of: hydrogen, halogen, —OH, and —$CO_2H$; and wherein n is 0 or 1. In one embodiment, $R^{30}$, $R^{31}$, $R^{34}$, and $R^{35}$ are each independently methyl. In one embodiment, the compound of formula (1) is a compound of formula (4), or a pharmaceutically acceptable salt, solvate, hydrate or stereoisomer thereof:

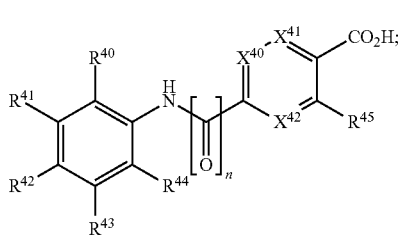

(4)

wherein $X^{40}$-$X^{42}$ are each independently N or $CR^{46}$, and at least one of $X^{40}$-$X^{42}$ is $CR^{46}$; wherein $R^{40}$-$R^{44}$ are each independently hydrogen, —$C_1$-$C_6$ alkyl, or —$OR^{47}$; wherein $R^{45}$ and $R^{46}$ are each independently selected from the group consisting of: hydrogen, halogen, —OH, and —$CO_2H$; wherein each $R^{47}$ is independently —$C_1$-$C_6$ alkyl; and wherein n is 0 or 1. In one embodiment, $R^{40}$ is hydrogen, $R^{41}$ is —$C_1$-$C_6$ alkyl, $R^{42}$ is hydrogen, $R^{43}$ is —$C_1$-$C_6$ alkyl, and $R^{44}$ is hydrogen. In one embodiment, $R^{40}$ is hydrogen, $R^{42}$ is hydrogen, and $R^{41}$ and $R^{43}$ are each independently a —$C_1$-$C_6$ branched alkyl selected from the group consisting of: isopropyl, isobutyl, sec-butyl, tert-butyl, isopentyl, neopentyl, 2-methylpentyl, 3-methylpentyl, 2,3-dimethylbutyl, and 2,2-dimethylbutyl. In one embodiment, $R^{40}$ is hydrogen, $R^{41}$ is —$C_1$-$C_6$ alkyl, $R^{42}$ is —$OR^{47}$, $R^{43}$ is hydrogen, and $R^{44}$ is hydrogen. In one embodiment, $R^{40}$ is hydrogen, $R^{42}$ is —$OR^{47}$, $R^{43}$ is hydrogen, and $R^{44}$ is hydrogen, and $R^{41}$ and $R^{47}$ are each independently a —$C_1$-$C_6$ branched alkyl selected from the group consisting of: isopropyl, isobutyl, sec-butyl, tert-butyl, isopentyl, neopentyl, 2-methylpentyl, 3-methylpentyl, 2,3-dimethylbutyl, and 2,2-dimethylbutyl. In one embodiment, $R^{40}$ is hydrogen, $R^{41}$ is —$OR^{47}$, $R^{42}$ is —$C_1$-$C_6$ alkyl, $R^{43}$ is hydrogen, and $R^{44}$ is hydrogen. In one embodiment, $R^{40}$ is hydrogen, $R^{41}$ is —$OR^{47}$, $R^{43}$ is hydrogen, and $R^{44}$ is hydrogen, and $R^{42}$ and $R^{47}$ are each independently a —$C_1$-$C_6$ branched alkyl selected from the group consisting of: isopropyl, isobutyl, sec-butyl, tert-butyl, isopentyl, neopentyl, 2-methylpentyl, 3-methylpentyl, 2,3-dimethylbutyl, and 2,2-dimethylbutyl. In one embodiment, the compound is selected from the group consisting of:

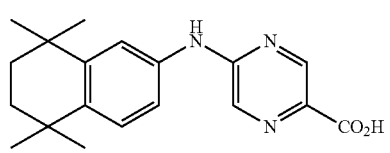

5

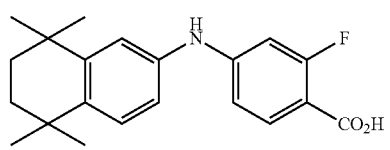

6

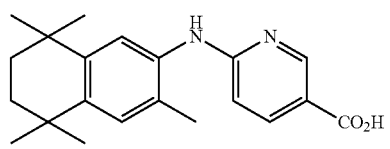

7

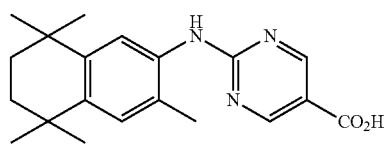

8

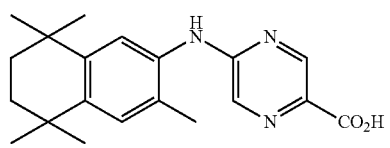

9

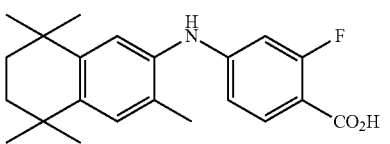

10

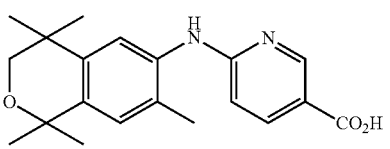

11

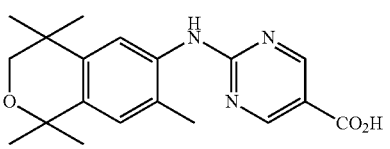

12

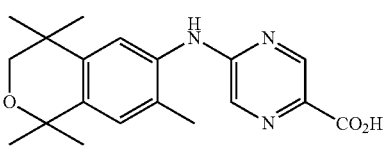

13

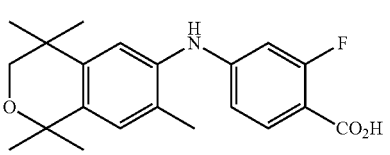

14

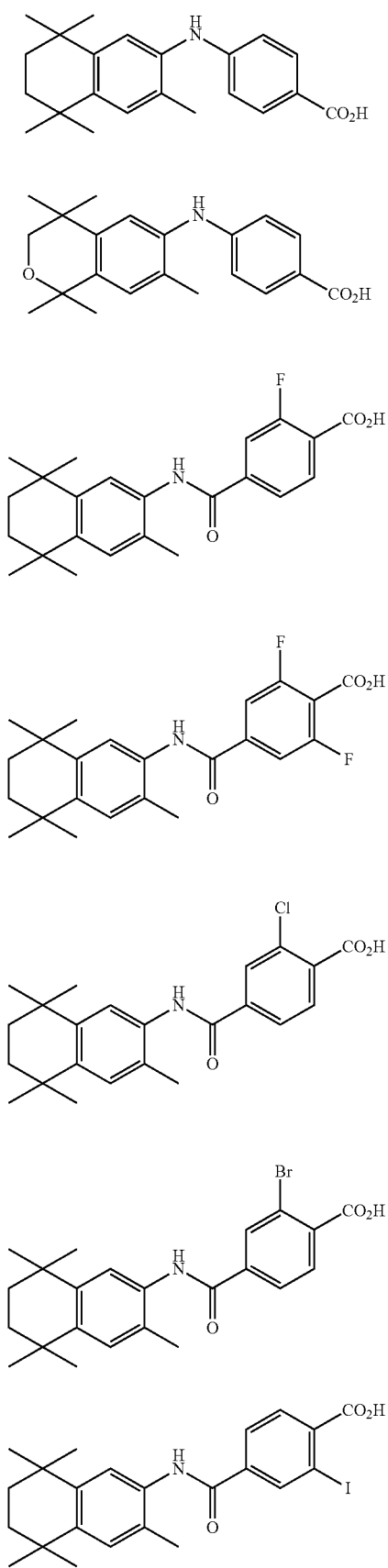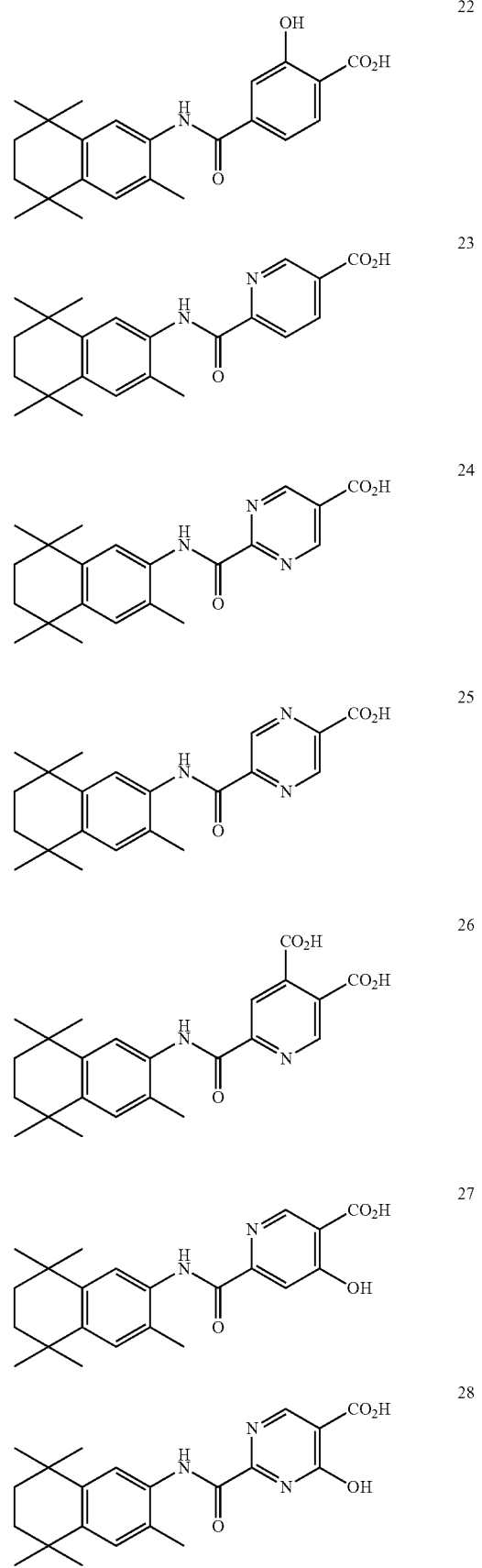

29
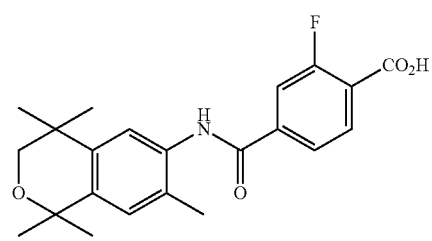
30
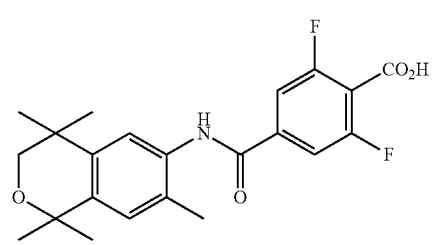
31
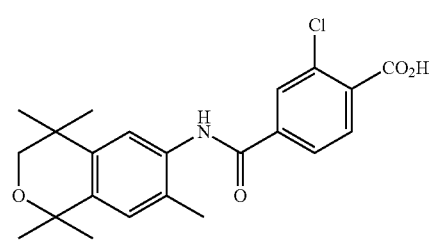
32
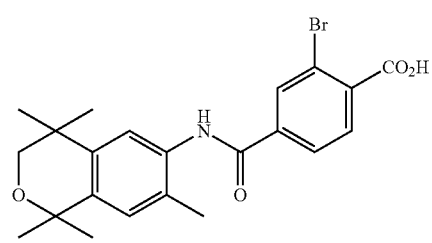
33
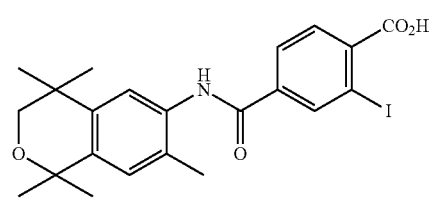
34
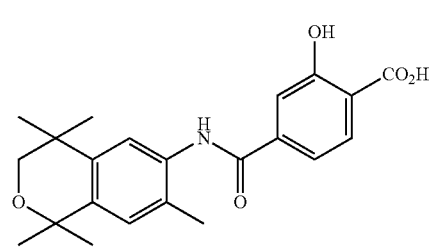
35
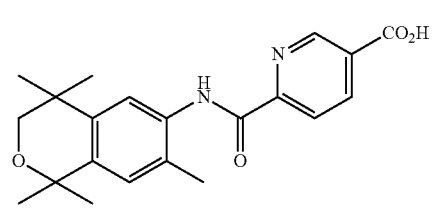
36
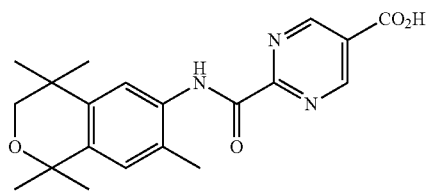
37
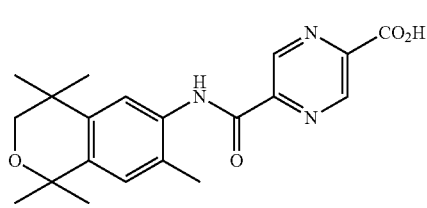
38
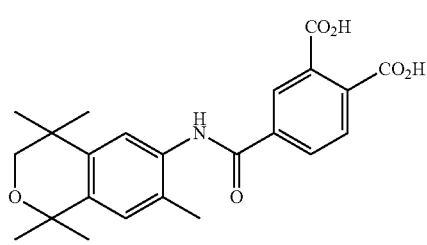
39
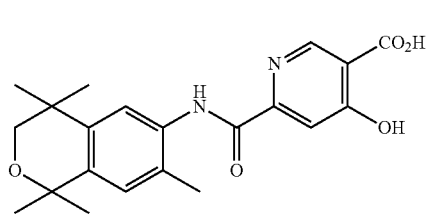
40
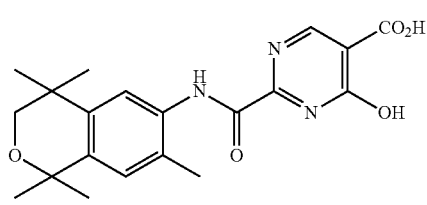
41
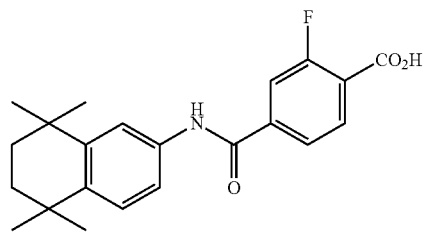
42
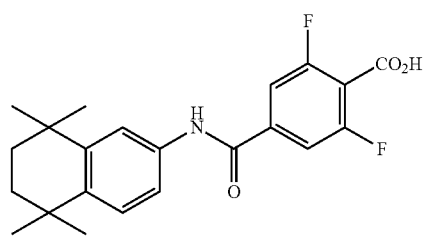

43 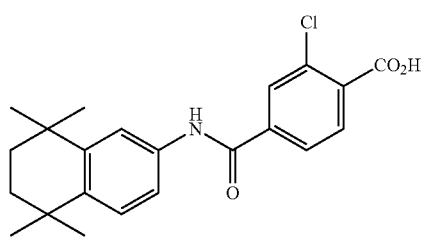
44 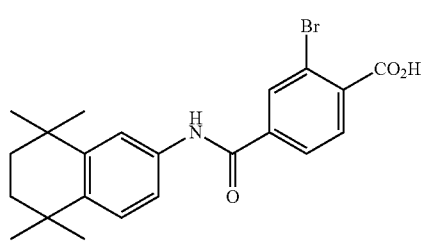
45 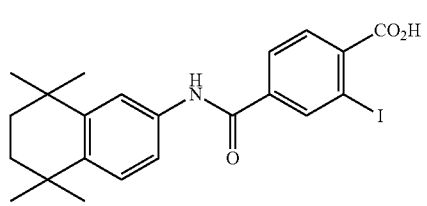
46 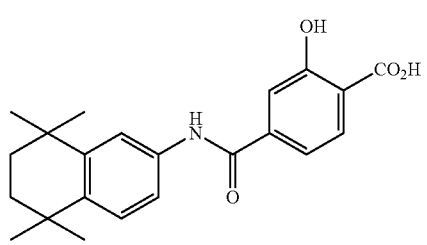
47 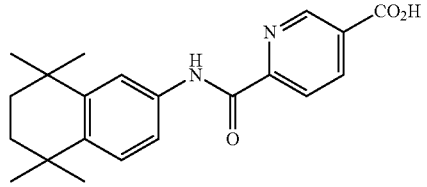
48 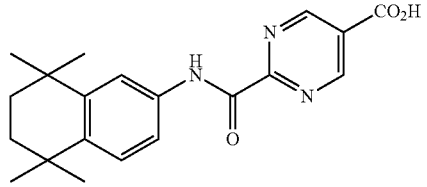
49 
50 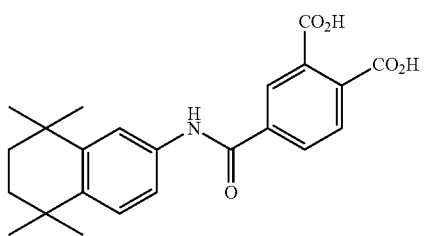
51 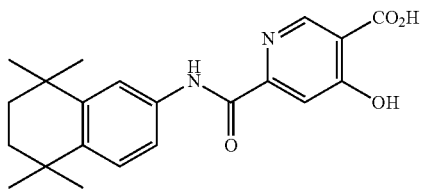
52 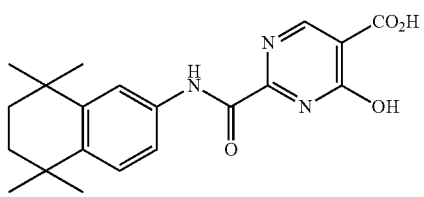
53 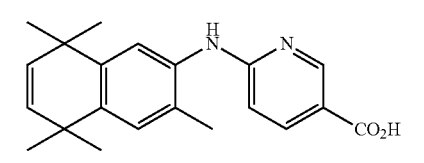
54 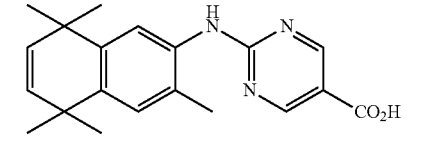
55 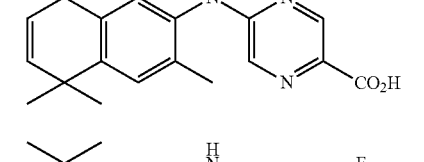
56 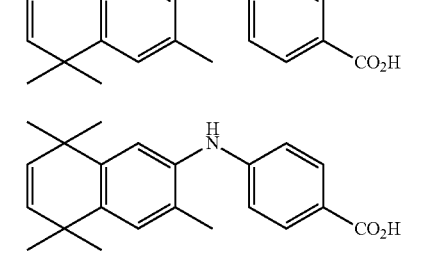
57 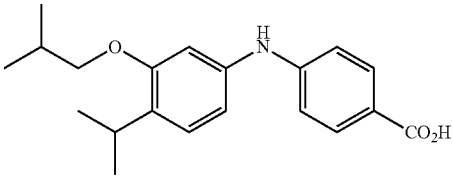
58 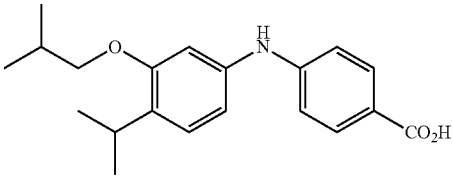

-continued
59 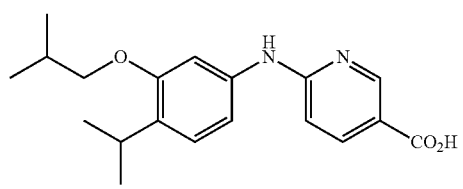
60 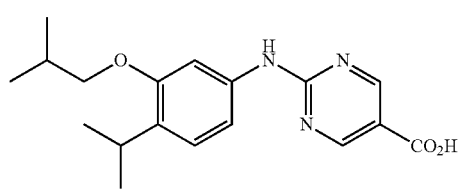
61 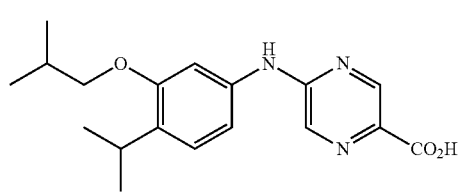
62 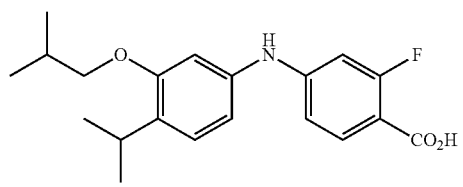
63 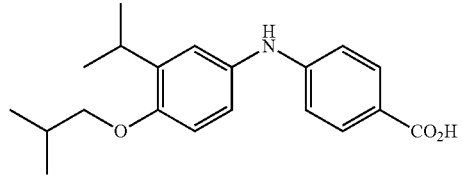
64 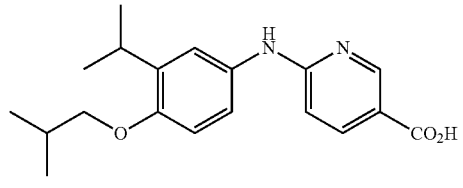
65 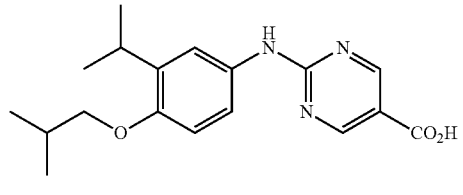
66 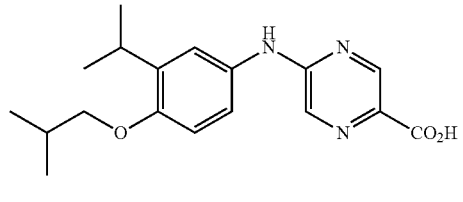
-continued
67 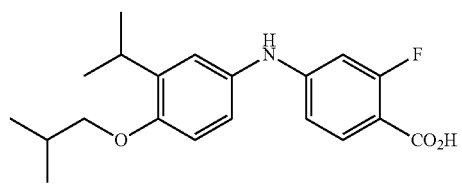
68 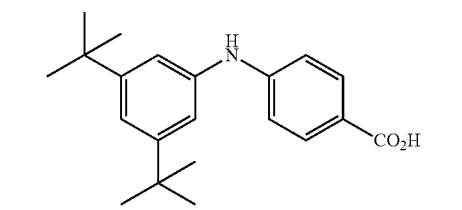
69 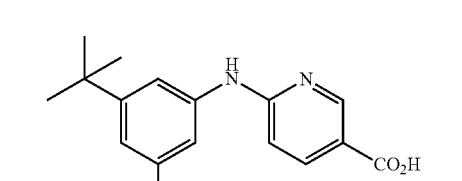
70 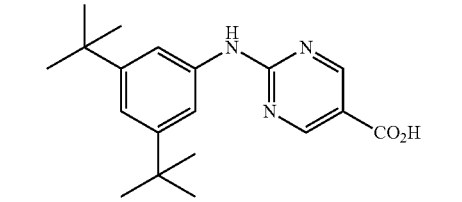
71 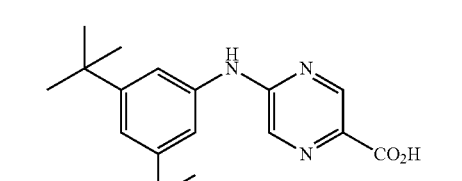
72 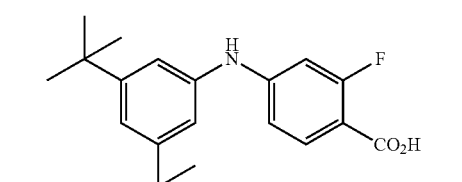
73 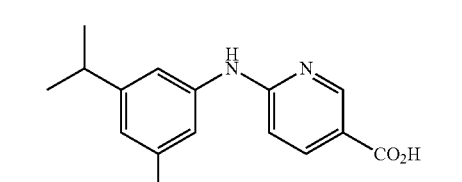

-continued
74
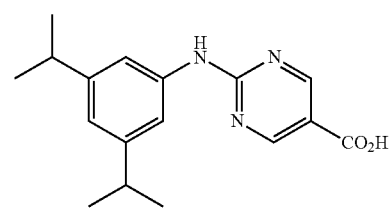
75
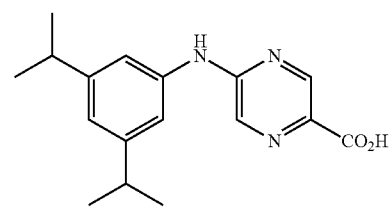
76
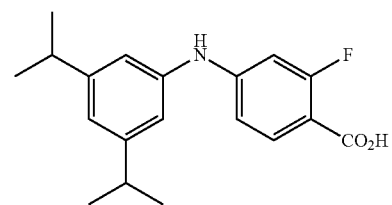
77
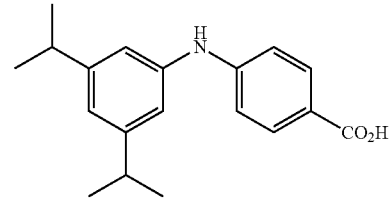
78
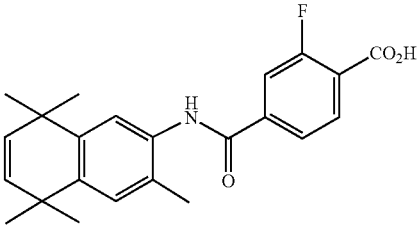
79
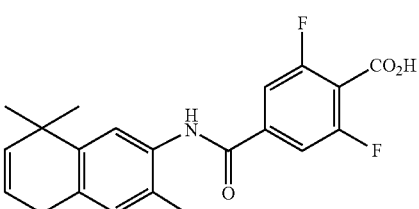
80
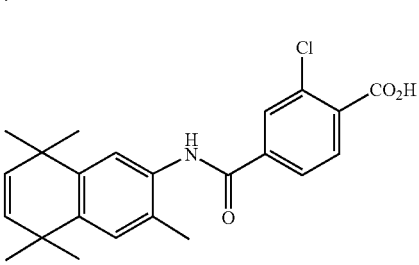
-continued
81
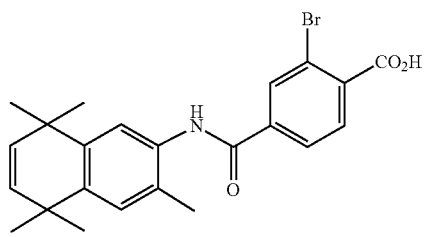
82
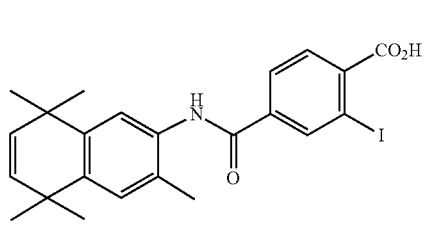
83
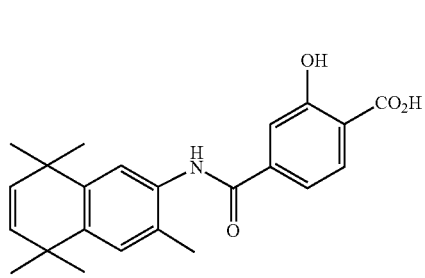
84
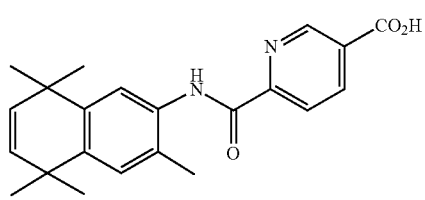
85
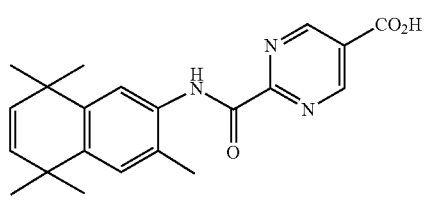
86
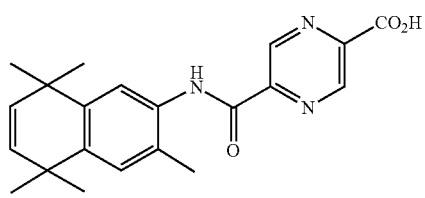
87
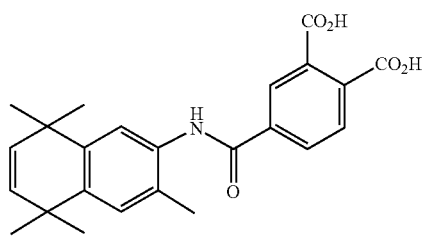

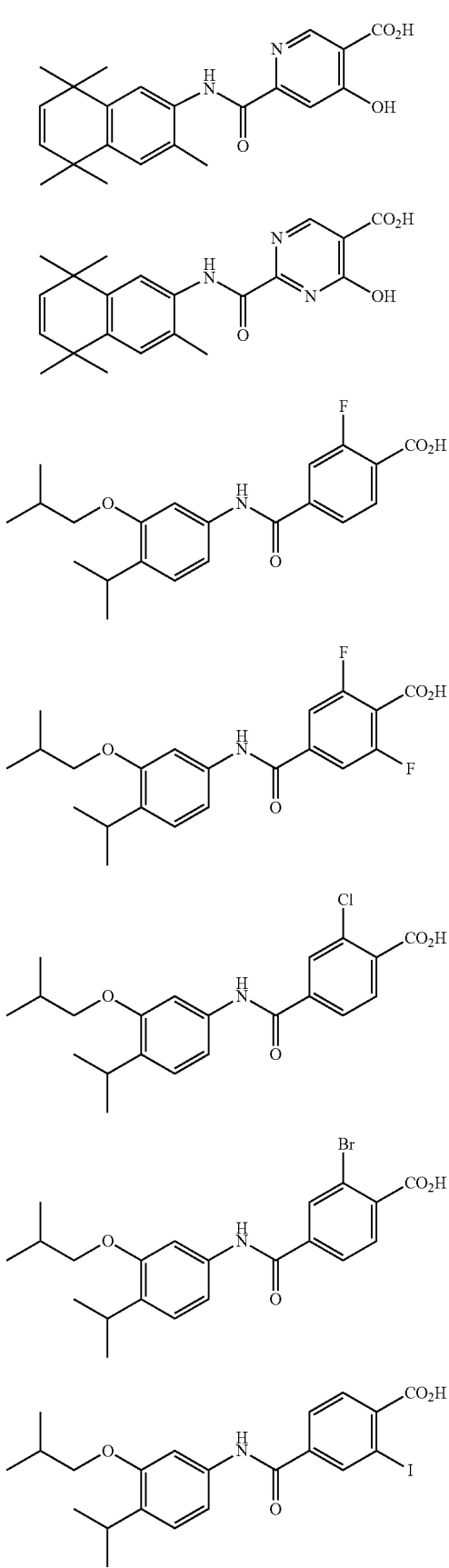
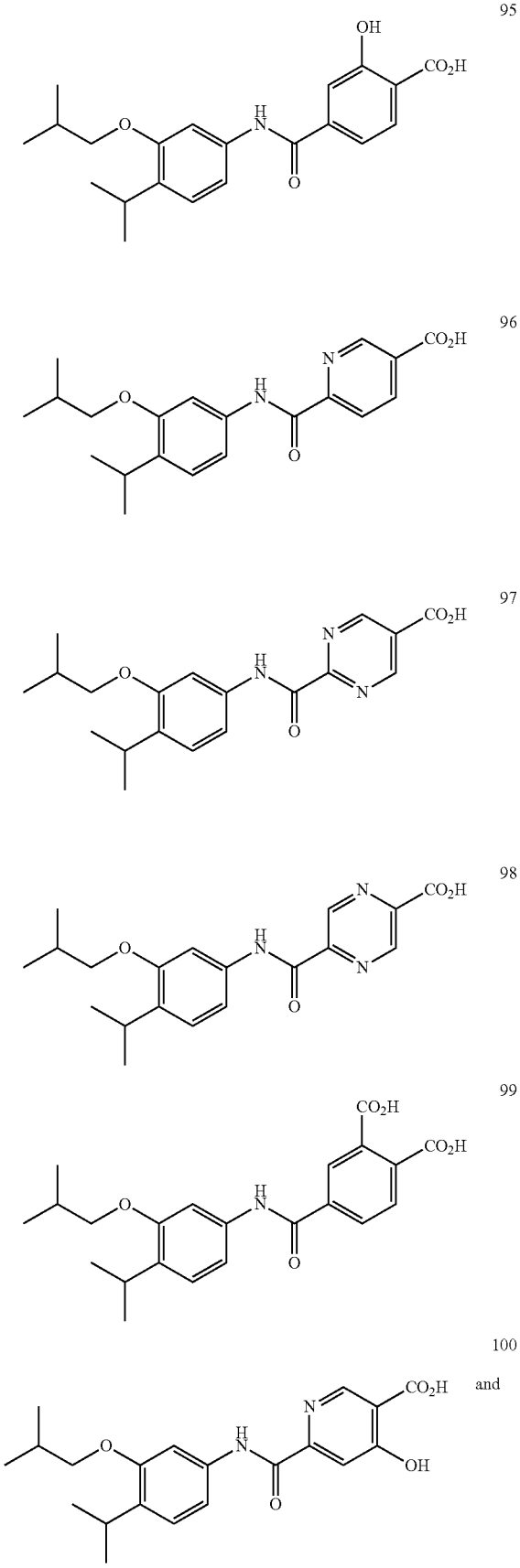

-continued

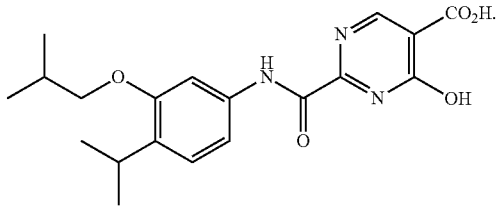

101

In another aspect, the present invention relates to a method of activating an RXR, an RAR, or both an RXR and RAR, the method comprising administering an effective amount of a composition comprising a compound of formula (1). In another aspect, the present invention relates to a method of treating dementia, the method comprising administering an effective amount of a composition comprising a compound of formula (1). In one embodiment, the dementia comprises Alzheimer's disease. In another aspect, the present invention relates to a method of treating cancer, the method comprising administering an effective amount of a composition comprising a compound of formula (1). In one embodiment, the cancer comprises leukemia.

DETAILED DESCRIPTION

In one aspect, the present invention relates to compositions comprising a retinoid X receptor (RXR) agonist, a retinoic acid receptor (RAR) agonist, or a dual RXR/RAR agonist. The present invention also relates to methods of using these agonists to treat and/or prevent dementia or cancer.

Definitions

Unless defined otherwise, all technical and scientific terms used herein have the same meaning as commonly understood by one of ordinary skill in the art to which this invention belongs. The skilled artisan will understand that any methods and materials similar or equivalent to those described herein can be used in the practice or testing of the present invention.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of 20%, ±10%, ±5%, ±1%, or ±0.1% from the specified value, as such variations are appropriate to perform the disclosed methods.

A "disease" is a state of health of an animal wherein the animal cannot maintain homeostasis, and wherein if the disease is not ameliorated then the animal's health continues to deteriorate.

In contrast, a "disorder" in an animal is a state of health in which the animal is able to maintain homeostasis, but in which the animal's state of health is less favorable than it would be in the absence of the disorder. Left untreated, a disorder does not necessarily cause a further decrease in the animal's state of health.

A disease or disorder is "alleviated" if the severity of a sign or symptom of the disease or disorder, the frequency with which such a sign or symptom is experienced by a patient, or both, is reduced.

The terms "patient," "subject," or "individual" are used interchangeably herein, and refer to any animal, or cells thereof whether in vitro or in situ, amenable to the methods described herein. In a non-limiting embodiment, the patient, subject or individual is a human.

As used herein, the term "pharmaceutical composition" refers to a mixture of at least one compound useful within the invention with a pharmaceutically acceptable carrier. The pharmaceutical composition facilitates administration of the compound to a patient or subject. Multiple techniques of administering a compound exist in the art including, but not limited to, intravenous, oral, aerosol, parenteral, ophthalmic, pulmonary and topical administration.

A "therapeutic" treatment is a treatment administered to a subject who exhibits signs or symptoms of pathology disease or disorder, for the purpose of diminishing or eliminating those signs or symptoms.

As used herein, the term "treatment" or "treating" is defined as the application or administration of a therapeutic agent, i.e., a compound of the invention (alone or in combination with another pharmaceutical agent), to a patient, or application or administration of a therapeutic agent to an isolated tissue or cell from a patient (e.g., for diagnosis or ex vivo applications), who has a disease or disorder contemplated herein, a sign or symptom of a disease or disorder contemplated herein or the potential to develop a disease or disorder contemplated herein, with the purpose to cure, heal, alleviate, relieve, alter, remedy, ameliorate, improve or affect a disease or disorder contemplated herein, the signs or symptoms of a disease or disorder contemplated herein or the potential to develop a disease or disorder contemplated herein. Such treatments may be specifically tailored or modified, based on knowledge obtained from the field of pharmacogenomics.

As used herein, the terms "effective amount," "pharmaceutically effective amount" and "therapeutically effective amount" refer to a sufficient amount of an agent to provide the desired biological or physiologic result. That result may be reduction and/or alleviation of a sign, a symptom, or a cause of a disease or disorder, or any other desired alteration of a biological system. An appropriate effective amount in any individual case may be determined by one of ordinary skill in the art using routine experimentation.

As used herein, the term "pharmaceutically acceptable" refers to a material, such as a carrier or diluent, which does not abrogate the biological activity or properties of the compound, and is relatively non-toxic, i.e., the material may be administered to an individual without causing an undesirable biological effect or interacting in a deleterious manner with any of the components of the composition in which it is contained.

As used herein, the language "pharmaceutically acceptable salt" refers to a salt of the administered compound prepared from pharmaceutically acceptable non-toxic acids, including inorganic acids, organic acids, solvates, hydrates, or clathrates thereof. Examples of such inorganic acids are hydrochloric, hydrobromic, hydroiodic, nitric, sulfuric, phosphoric, acetic, hexafluorophosphoric, citric, gluconic, benzoic, propionic, butyric, sulfosalicylic, maleic, lauric, malic, fumaric, succinic, tartaric, amsonic, pamoic, p-tolunenesulfonic, and mesylic. Appropriate organic acids may be selected, for example, from aliphatic, aromatic, carboxylic and sulfonic classes of organic acids, examples of which are formic, acetic, propionic, succinic, camphorsulfonic, citric, fumaric, gluconic, isethionic, lactic, malic, mucic, tartaric, para-toluenesulfonic, glycolic, glucuronic, maleic, furoic, glutamic, benzoic, anthranilic, salicylic, phenylacetic, mandelic, embonic (pamoic), methanesulfonic, ethanesulfonic, pantothenic, benzenesulfonic (besylate), stearic, sulfanilic, alginic, galacturonic, and the like. Furthermore, pharmaceutically acceptable salts include, by way of non-limiting example, alkaline earth metal salts (e.g., calcium or magnesium), alkali metal salts (e.g., sodium-dependent or potassium), and ammonium salts.

As used herein, the term "pharmaceutically acceptable carrier" means a pharmaceutically acceptable material, composition or carrier, such as a liquid or solid filler, stabilizer, dispersing agent, suspending agent, diluent, excipient, thickening agent, solvent or encapsulating material, involved in carrying or transporting a compound useful within the invention within or to the patient such that it may perform its intended function. Typically, such constructs are carried or transported from one organ, or portion of the body, to another organ, or portion of the body. Each carrier must be "acceptable" in the sense of being compatible with the other ingredients of the formulation, including the compound useful within the invention, and not injurious to the patient. Some examples of materials that may serve as pharmaceutically acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; surface active agents; alginic acid; pyrogen-free water; isotonic saline; Ringer's solution; ethyl alcohol; phosphate buffer solutions; and other non-toxic compatible substances employed in pharmaceutical formulations. As used herein, "pharmaceutically acceptable carrier" also includes any and all coatings, antibacterial and antifungal agents, and absorption delaying agents, and the like that are compatible with the activity of the compound useful within the invention, and are physiologically acceptable to the patient. Supplementary active compounds may also be incorporated into the compositions. The "pharmaceutically acceptable carrier" may further include a pharmaceutically acceptable salt of the compound useful within the invention. Other additional ingredients that may be included in the pharmaceutical compositions used in the practice of the invention are known in the art.

As used herein, the term "cancer" refers to any of various types of malignant neoplasms, most of which invade surrounding tissues, may metastasize to several sites and are likely to recur after attempted removal and to cause death of the patient unless adequately treated. As used herein, neoplasia comprises cancer. Representative cancers include, for example, squamous-cell carcinoma, basal cell carcinoma, adenocarcinoma, hepatocellular carcinomas, and renal cell carcinomas, cancer of the bladder, bowel, breast, cervix, colon, esophagus, head, kidney, liver, lung, neck, ovary, pancreas, prostate, and stomach; leukemias, including non-acute and acute leukemias, such as acute myelogenous leukemia, acute lymphocytic leukemia, acute promyelocytic leukemia (APL), acute T-cell lymphoblastic leukemia, T-lineage acute lymphoblastic leukemia (T-ALL), adult T-cell leukemia, basophilic leukemia, eosinophilic leukemia, granulocytic leukemia, hairy cell leukemia, leukopenic leukemia, lymphatic leukemia, lymphoblastic leukemia, lymphocytic leukemia, megakaryocytic leukemia, micromyeloblastic leukemia, monocytic leukemia, neutrophilic leukemia and stem cell leukemia; benign and malignant lymphomas, particularly Burkitt's lymphoma and Non-Hodgkin's lymphoma; benign and malignant melanomas; myeloproliferative diseases; sarcomas, including Ewing's sarcoma, hemangiosarcoma, Kaposi's sarcoma, liposarcoma, myosarcomas, peripheral neuroepithelioma, synovial sarcoma, gliomas, astrocytomas, oligodendrogliomas, ependymomas, gliobastomas, neuroblastomas, ganglioneuromas, gangliogliomas, medulloblastomas, pineal cell tumors, meningiomas, meningeal sarcomas, neurofibromas, and Schwannomas; bowel cancer, breast cancer, prostate cancer, cervical cancer, uterine cancer, lung cancer, ovarian cancer, testicular cancer, thyroid cancer, astrocytoma, esophageal cancer, pancreatic cancer, stomach cancer, liver cancer, colon cancer, melanoma; carcinosarcoma, Hodgkin's disease, Wilms' tumor and teratocarcinomas, among others, which may be treated by one or more compounds of the present invention.

As used herein, the term "alkyl," by itself or as part of another substituent means, unless otherwise stated, a straight or branched chain hydrocarbon having the number of carbon atoms designated (i.e. $C_{1-6}$ means one to six carbon atoms) and including straight, branched chain, or cyclic substituent groups. Examples include methyl, ethyl, propyl, isopropyl, butyl, isobutyl, tert-butyl, pentyl, neopentyl, hexyl, and cyclopropylmethyl.

As used herein, the term "substituted alkyl" means alkyl as defined above, substituted by one, two or three substituents selected from the group consisting of halogen, —OH, alkoxy, —NH$_2$, amino, azido, —N(CH$_3$)$_2$, —C(=O)OH, trifluoromethyl, —C≡N, —C(=O)O(C$_1$-C$_4$)alkyl, —C(=O)NH$_2$, —SO$_2$NH$_2$, —C(=NH)NH$_2$, and —NO$_2$. Examples of substituted alkyls include, but are not limited to, 2,2-difluoropropyl, 2-carboxycyclopentyl and 3-chloropropyl.

As used herein, the term "heteroalkyl" by itself or in combination with another term means, unless otherwise stated, a stable straight or branched chain alkyl group consisting of the stated number of carbon atoms and one or two heteroatoms selected from the group consisting of O, N, and S, and wherein the nitrogen and sulfur atoms may be optionally oxidized and the nitrogen heteroatom may be optionally quaternized. The heteroatom(s) may be placed at any position of the heteroalkyl group, including between the rest of the heteroalkyl group and the fragment to which it is attached, as well as attached to the most distal carbon atom in the heteroalkyl group. Examples include: —O—CH$_2$—CH$_2$—CH$_3$, —CH$_2$—CH$_2$—CH$_2$—OH, —CH$_2$—CH$_2$—NH—CH$_3$, —CH$_2$—S—CH$_2$—CH$_3$, and —CH$_2$CH$_2$—S(=O)—CH$_3$. Up to two heteroatoms may be consecutive, such as, for example, —CH$_2$—NH—OCH$_3$, or —CH$_2$—CH$_2$—S—S—CH$_3$ As used herein, the term "alkoxy" employed alone or in combination with other terms means, unless otherwise stated, an alkyl group having the designated number of carbon atoms, as defined above, connected to the rest of the molecule via an oxygen atom, such as, for example, methoxy, ethoxy, 1-propoxy, 2-propoxy (isopropoxy) and the higher homologs and isomers.

As used herein, the term "halo" or "halogen" alone or as part of another substituent means, unless otherwise stated, a fluorine, chlorine, bromine, or iodine atom.

As used herein, the term "cycloalkyl" refers to a mono cyclic or polycyclic non-aromatic radical, wherein each of the atoms forming the ring (i.e. skeletal atoms) is a carbon atom. In one embodiment, the cycloalkyl group is saturated or partially unsaturated. In another embodiment, the cycloalkyl group is fused with an aromatic ring. Cycloalkyl groups include groups having from 3 to 10 ring atoms. Illustrative examples of cycloalkyl groups include, but are not limited to, the following moieties:

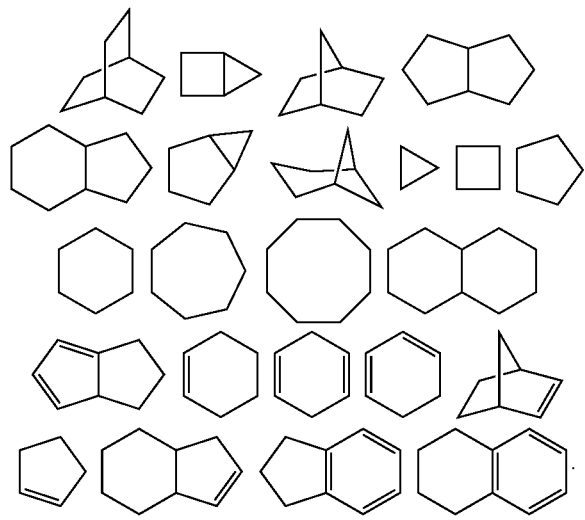

Monocyclic cycloalkyls include, but are not limited to, cyclopropyl, cyclobutyl, cyclopentyl, cyclohexyl, cycloheptyl, and cyclooctyl. Dicyclic cycloalkyls include, but are not limited to, tetrahydronaphthyl, indanyl, and tetrahydropentalene. Polycyclic cycloalkyls include adamantine and norbornane. The term cycloalkyl includes "unsaturated nonaromatic carbocyclyl" or "nonaromatic unsaturated carbocyclyl" groups, both of which refer to a nonaromatic carbocycle as defined herein, which contains at least one carbon double bond or one carbon triple bond.

As used herein, the term "heterocycloalkyl" or "heterocyclyl" refers to a heteroalicyclic group containing one to four ring heteroatoms each selected from O, S and N. In one embodiment, each heterocycloalkyl group has from 4 to 10 atoms in its ring system, with the proviso that the ring of said group does not contain two adjacent O or S atoms. In another embodiment, the heterocycloalkyl group is fused with an aromatic ring. In one embodiment, the nitrogen and sulfur heteroatoms may be optionally oxidized, and the nitrogen atom may be optionally quaternized. The heterocyclic system may be attached, unless otherwise stated, at any heteroatom or carbon atom that affords a stable structure. A heterocycle may be aromatic or non-aromatic in nature. In one embodiment, the heterocycle is a heteroaryl.

An example of a 3-membered heterocycloalkyl group includes, and is not limited to, aziridine. Examples of 4-membered heterocycloalkyl groups include, and are not limited to, azetidine and a beta lactam. Examples of 5-membered heterocycloalkyl groups include, and are not limited to, pyrrolidine, oxazolidine and thiazolidinedione. Examples of 6-membered heterocycloalkyl groups include, and are not limited to, piperidine, morpholine and piperazine. Other non-limiting examples of heterocycloalkyl groups are:

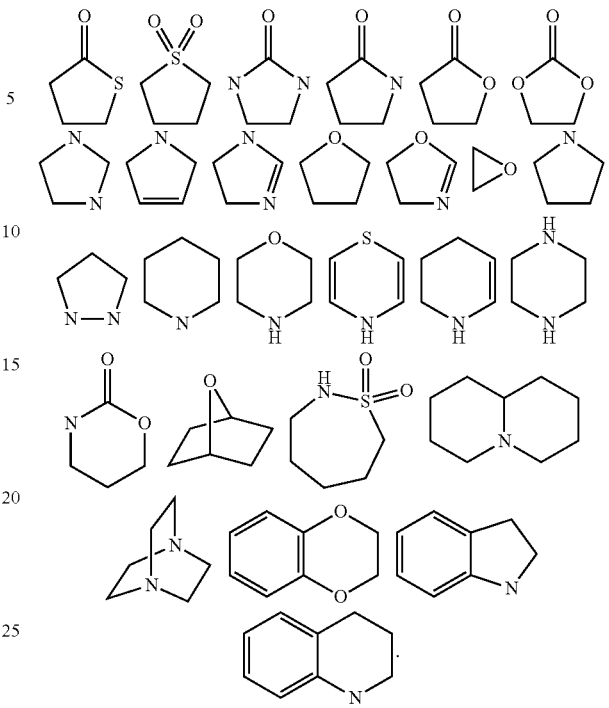

Examples of non-aromatic heterocycles include monocyclic groups such as aziridine, oxirane, thiirane, azetidine, oxetane, thietane, pyrrolidine, pyrroline, pyrazolidine, imidazoline, dioxolane, sulfolane, 2,3-dihydrofuran, 2,5-dihydrofuran, tetrahydrofuran, thiophane, piperidine, 1,2,3,6-tetrahydropyridine, 1,4-dihydropyridine, piperazine, morpholine, thiomorpholine, pyran, 2,3-dihydropyran, tetrahydropyran, 1,4-dioxane, 1,3-dioxane, homopiperazine, homopiperidine, 1,3-dioxepane, 4,7-dihydro-1,3-dioxepin, and hexamethyleneoxide.

As used herein, the term "aromatic" refers to a carbocycle or heterocycle with one or more polyunsaturated rings and having aromatic character, i.e. having (4n+2) delocalized π (pi) electrons, where n is an integer.

As used herein, the term "aryl," employed alone or in combination with other terms, means, unless otherwise stated, a carbocyclic aromatic system containing one or more rings (typically one, two or three rings), wherein such rings may be attached together in a pendent manner, such as a biphenyl, or may be fused, such as naphthalene. Examples of aryl groups include phenyl, anthracyl, and naphthyl.

As used herein, the term "aryl-($C_1$-$C_3$)alkyl" means a functional group wherein a one- to three-carbon alkylene chain is attached to an aryl group, e.g., —$CH_2CH_2$-phenyl. In one embodiment, aryl-($C_1$-$C_3$)alkyl is aryl-$CH_2$— or aryl-$CH(CH_3)$—. The term "substituted aryl-($C_1$-$C_3$)alkyl" means an aryl-($C_1$-$C_3$)alkyl functional group in which the aryl group is substituted. Similarly, the term "heteroaryl-($C_1$-$C_3$)alkyl" means a functional group wherein a one to three carbon alkylene chain is attached to a heteroaryl group, e.g., —$CH_2CH_2$-pyridyl. The term "substituted heteroaryl-($C_1$-$C_3$)alkyl" means a heteroaryl-($C_1$-$C_3$)alkyl functional group in which the heteroaryl group is substituted.

As used herein, the term "heteroaryl" or "heteroaromatic" refers to a heterocycle having aromatic character. A polycyclic heteroaryl may include one or more rings that are partially saturated. Examples include the following moieties:

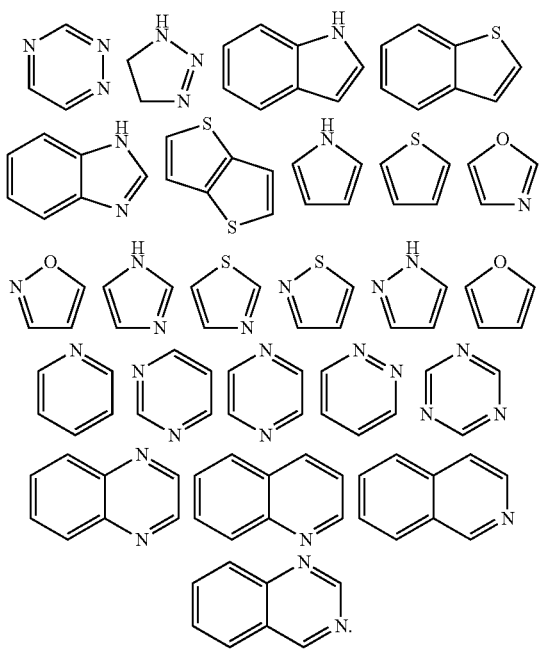

Examples of heteroaryl groups also include pyridyl, pyrazinyl, pyrimidinyl (particularly 2- and 4-pyrimidinyl), pyridazinyl, thienyl, furyl, pyrrolyl (particularly 2-pyrrolyl), imidazolyl, thiazolyl, oxazolyl, pyrazolyl (particularly 3- and 5-pyrazolyl), isothiazolyl, 1,2,3-triazolyl, 1,2,4-triazolyl, 1,3,4-triazolyl, tetrazolyl, 1,2,3-thiadiazolyl, 1,2,3-oxadiazolyl, 1,3,4-thiadiazolyl and 1,3,4-oxadiazolyl.

Examples of polycyclic heterocycles and heteroaryls include indolyl (particularly 3-, 4-, 5-, 6- and 7-indolyl), indolinyl, quinolyl, tetrahydroquinolyl, isoquinolyl (particularly 1- and 5-isoquinolyl), 1,2,3,4-tetrahydroisoquinolyl, cinnolinyl, quinoxalinyl (particularly 2- and 5-quinoxalinyl), quinazolinyl, phthalazinyl, 1,8-naphthyridinyl, 1,4-benzodioxanyl, coumarin, dihydrocoumarin, 1,5-naphthyridinyl, benzofuryl (particularly 3-, 4-, 5-, 6- and 7-benzofuryl), 2,3-dihydrobenzofuryl, 1,2-benzisoxazolyl, benzothienyl (particularly 3-, 4-, 5-, 6-, and 7-benzothienyl), benzoxazolyl, benzothiazolyl (particularly 2-benzothiazolyl and 5-benzothiazolyl), purinyl, benzimidazolyl (particularly 2-benzimidazolyl), benzotriazolyl, thioxanthinyl, carbazolyl, carbolinyl, acridinyl, pyrrolizidinyl, and quinolizidinyl.

As used herein, the term "substituted" means that an atom or group of atoms has replaced hydrogen as the substituent attached to another group. The term "substituted" further refers to any level of substitution, namely mono-, di-, tri-, tetra-, or penta-substitution, where such substitution is permitted. The substituents are independently selected, and substitution may be at any chemically accessible position. In one embodiment, the substituents vary in number between one and four. In another embodiment, the substituents vary in number between one and three. In yet another embodiment, the substituents vary in number between one and two.

As used herein, the term "optionally substituted" means that the referenced group may be substituted or unsubstituted. In one embodiment, the referenced group is optionally substituted with zero substituents, i.e., the referenced group is unsubstituted. In another embodiment, the referenced group is optionally substituted with one or more additional group(s) individually and independently selected from groups described herein.

In one embodiment, the substituents are independently selected from the group consisting of oxo, halogen, —CN, —NH$_2$, —OH, —NH(CH$_3$), —N(CH$_3$)$_2$, alkyl (including straight chain, branched and/or unsaturated alkyl), substituted or unsubstituted cycloalkyl, substituted or unsubstituted heterocycloalkyl, fluoro alkyl, substituted or unsubstituted heteroalkyl, substituted or unsubstituted alkoxy, fluoroalkoxy, —S-alkyl, S(═O)$_2$alkyl, —C(═O)NH[substituted or unsubstituted alkyl, or substituted or unsubstituted phenyl], —C(═O)N[H or alkyl]$_2$, —OC(═O)N[substituted or unsubstituted alkyl]$_2$, —NHC(═O)NH [substituted or unsubstituted alkyl, or substituted or unsubstituted phenyl], —NHC(═O)alkyl, —N[substituted or unsubstituted alkyl]C(═O)[substituted or unsubstituted alkyl], —NHC(═O)[substituted or unsubstituted alkyl], —C(OH)[substituted or unsubstituted alkyl]$_2$, and —C(NH$_2$)[substituted or unsubstituted alkyl]$_2$. In another embodiment, by way of example, an optional substituent is selected from oxo, fluorine, chlorine, bromine, iodine, —CN, —NH$_2$, —OH, —NH(CH$_3$), —N(CH$_3$)$_2$, —CH$_3$, —CH$_2$CH$_3$, —CH(CH$_3$)$_2$, —CF$_3$, —CH$_2$CF$_3$, —OCH$_3$, —OCH$_2$CH$_3$, —OCH(CH$_3$)$_2$, —OCF$_3$, —OCH$_2$CF$_3$, —S(═O)$_2$—CH$_3$, —C(═O)NH$_2$, —C(═O)—NHCH$_3$, —NHC(═O)NHCH$_3$, —C(═O)CH$_3$, —ON(O)$_2$, and —C(═O)OH. In yet one embodiment, the substituents are independently selected from the group consisting of C$_{1-6}$ alkyl, —OH, C$_{1-6}$ alkoxy, halo, amino, acetamido, oxo and nitro. In yet another embodiment, the substituents are independently selected from the group consisting of C$_{1-6}$ alkyl, C$_{1-6}$ alkoxy, halo, acetamido, and nitro. As used herein, where a substituent is an alkyl or alkoxy group, the carbon chain may be branched, straight or cyclic.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Compounds

The compounds of the present invention may be synthesized using techniques well-known in the art of organic synthesis. The starting materials and intermediates required for the synthesis may be obtained from commercial sources or synthesized according to methods known to those skilled in the art.

In one aspect, the compound of the invention is a compound of formula (1), or a pharmaceutically acceptable salt, solvate, hydrate or stereoisomer thereof:

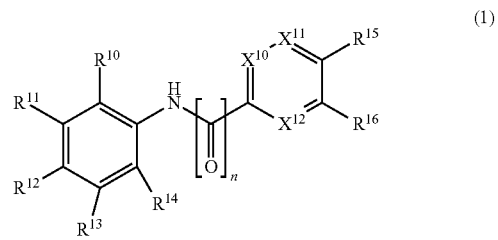

(1)

wherein $X^{10}$-$X^{12}$ are each independently N or $CR^{17}$;

wherein $R^{10}$-$R^{17}$ are each independently selected from the group consisting of: hydrogen, deuterium, halogen, —OH, —$CO_2R^{18}$, —$(CR^{19}R^{110})_m$—O—$R^{111}$, —$C_1$-$C_6$ alkyl, —$C_3$-$C_6$ cycloalkyl, —$C_2$-$C_4$-alkynyl, —$C_2$-$C_4$-alkenyl, alkoxy, alkylthio, aryl, —$C_1$-$C_6$ heteroalkyl, —$C_3$-$C_6$ heterocycyl, —$C_3$-$C_6$ heteroaryl, amido, amino, cyano, and combinations thereof;

wherein two adjacent $R^{10}$-$R^{14}$ optionally fuse or join to form a ring which is optionally further substituted;

wherein $R^{18}$, $R^{19}$, $R^{110}$, and $R^{111}$ are each independently hydrogen or —$C_1$-$C_6$ alkyl;

wherein m is 0, 1, or 2; and wherein n is 0 or 1.

In one embodiment, at least one of $X^{10}$-$X^{12}$ is $CR^{17}$.

In one embodiment, $R^{10}$ is hydrogen.

In one embodiment, $R^{11}$ and $R^{12}$ fuse or join to form a ring. In one embodiment, $R^{11}$ and $R^{12}$ fuse or join to form a carbocyclic ring. $R^{11}$ and $R^{12}$ fuse or join to form a heterocyclic ring. In one embodiment, $R^{11}$ and $R^{12}$ fuse or join to form a heterocyclic ring comprising an oxygen atom. In one embodiment, the ring formed by $R^{11}$ and $R^{12}$ is substituted. In one embodiment, the ring formed by $R^{11}$ and $R^{12}$ is substituted with one or more —$C_1$-$C_6$ alkyl groups. In one embodiment, the —$C_1$-$C_6$ alkyl substituents are linear —$C_1$-$C_6$ alkyl substituents. In one embodiment, the linear —$C_1$-$C_6$ alkyl substituents are each methyl.

In one embodiment, $R^{11}$ and $R^{12}$ do not fuse or join to form a ring. In one embodiment, $R^{11}$ and $R^{12}$ are each independently selected from the group consisting of hydrogen, —$C_1$-$C_6$ alkyl, and —$(CR^{19}R^{110})_m$—O—$R^{111}$. In one embodiment, one of $R^{11}$ or $R^{12}$ is hydrogen. In one embodiment, one of $R^{11}$ or $R^{12}$ is —$C_1$-$C_6$ alkyl. In one embodiment, one of $R^{11}$ or $R^{12}$ is a branched —$C_1$-$C_6$ alkyl. In one embodiment, one of $R^{11}$ or $R^{12}$ is —$(CR^{19}R^{110})_m$—O—$R^{111}$. In one embodiment, one of $R^{11}$ or $R^{12}$ is —$(CR^{19}R^{110})_m$—O—$R^{111}$ wherein m is 0 and $R^{111}$ is a —$C_1$-$C_6$ alkyl.

In one embodiment, $R^{13}$ is hydrogen.

In one embodiment, $R^{13}$ is —$C_1$-$C_6$ alkyl. In one embodiment, $R^{13}$ is branched —$C_1$-$C_6$ alkyl.

In one embodiment, $R^{13}$ is —$(CR^{19}R^{110})_m$—O—$R^{111}$. In one embodiment, $R^{13}$ is —$(CR^{19}R^{110})_m$—O—$R^{111}$ wherein m is 0 and $R^{111}$ is a —$C_1$-$C_6$ alkyl.

In one embodiment, $R^{14}$ is hydrogen.

In one embodiment, $R^{14}$ is a —$C_1$-$C_6$ alkyl. In one embodiment, $R^{14}$ is a linear —$C_1$-$C_6$ alkyl. In one embodiment, $R^{14}$ is selected from the group consisting of methyl, ethyl, propyl, isopropyl, n-butyl, iso-butyl, t-butyl, n-pentyl, and n-hexyl. In one embodiment, $R^{14}$ is methyl.

In one embodiment, $R^{15}$ is —$CO_2R^{18}$. In one embodiment, $R^{15}$ is —$CO_2R^{18}$ wherein $R^{18}$ is hydrogen.

In one embodiment, $R^{16}$ is hydrogen.

In one embodiment, $R^{16}$ is —$CO_2R^{18}$. In one embodiment, $R^{16}$ is —$CO_2R^{18}$ wherein $R^{18}$ is hydrogen.

In one embodiment, $R^{16}$ is —OH.

In one embodiment, $R^{16}$ is a halogen. In one embodiment $R^{16}$ is Br. In one embodiment, $R^{16}$ is Cl. In one embodiment, $R^{16}$ is F. In one embodiment, $R^{16}$ is I.

In one embodiment, $R^{17}$ is hydrogen.

In one embodiment, $R^{17}$ is —$CO_2R^{18}$. In one embodiment, $R^{17}$ is —$CO_2R^{18}$ wherein $R^{18}$ is hydrogen.

In one embodiment, $R^{17}$ is —OH.

In one embodiment, $R^{17}$ is a halogen. In one embodiment $R^{17}$ is Br. In one embodiment, $R^{17}$ is Cl. In one embodiment, $R^{17}$ is F. In one embodiment, $R^{17}$ is I.

In one embodiment, n is 0.

In one embodiment, n is 1.

In one embodiment, the compound of formula (1) is a compound selected from the group consisting of:

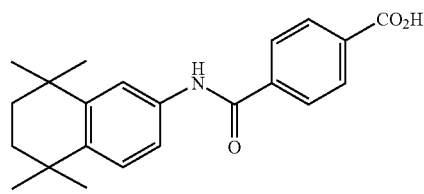

1

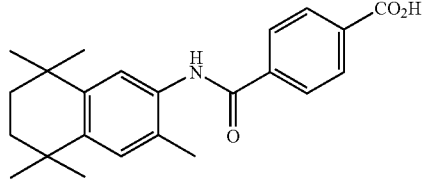

2

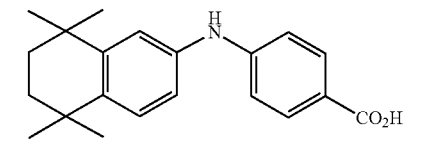

3

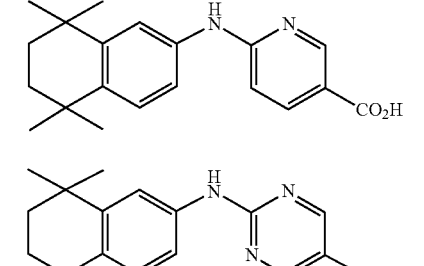

4

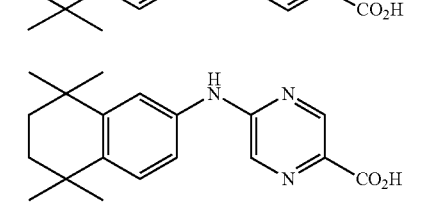

5

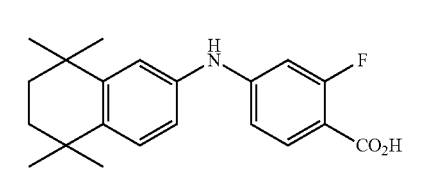

6

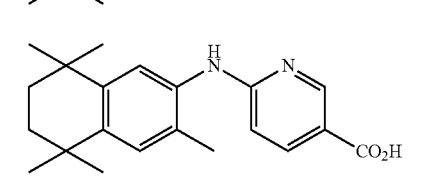

7

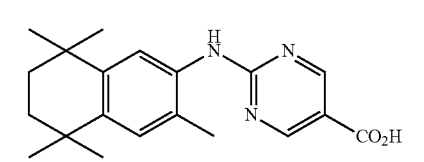

8

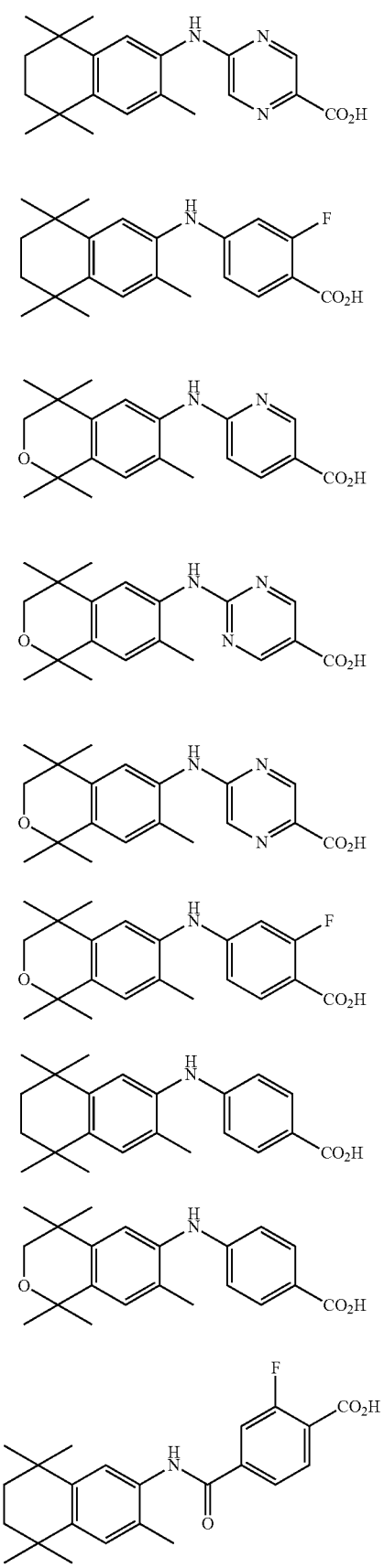
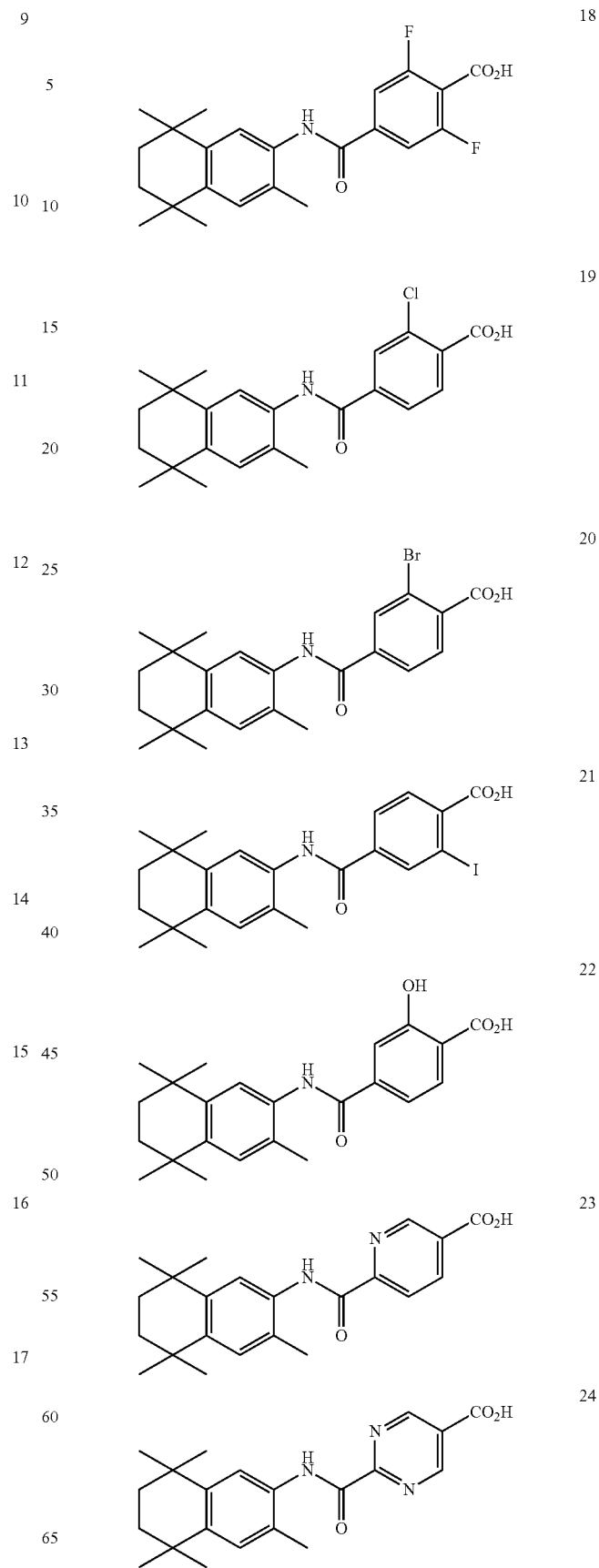

25
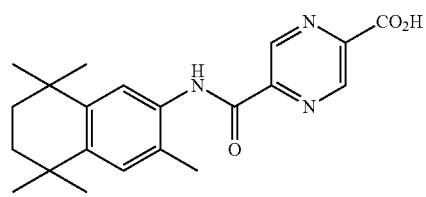
26
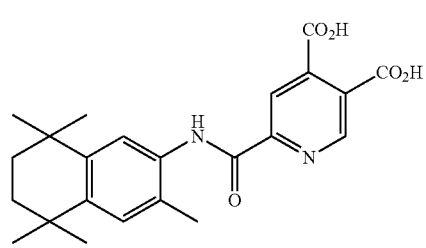
27
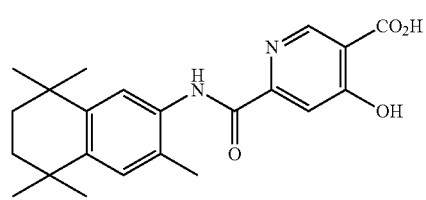
28
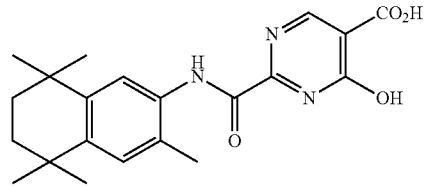
29
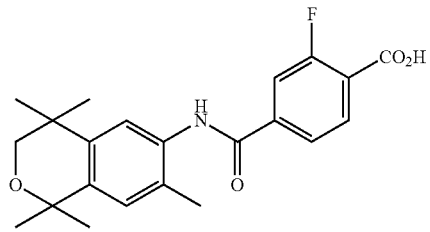
30
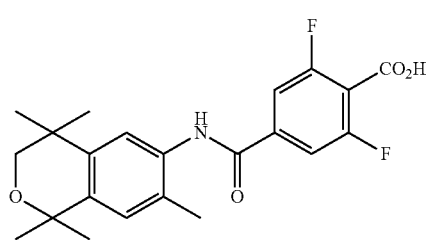
31
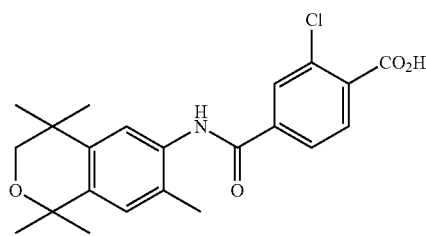
32
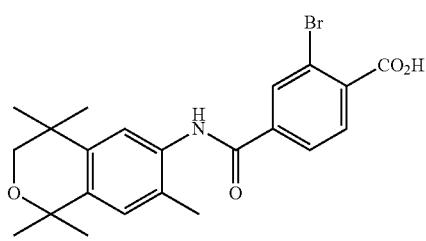
33
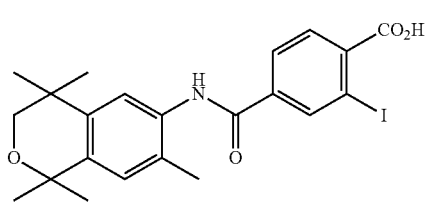
34
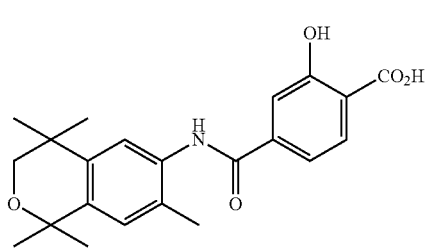
35
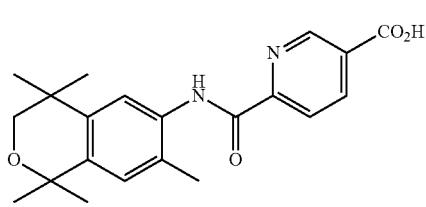
36
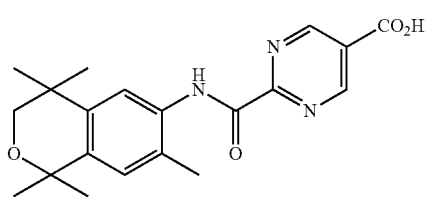
37
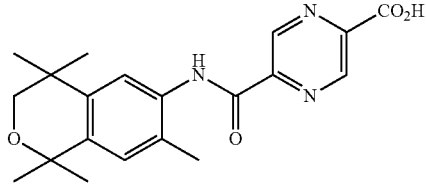
38
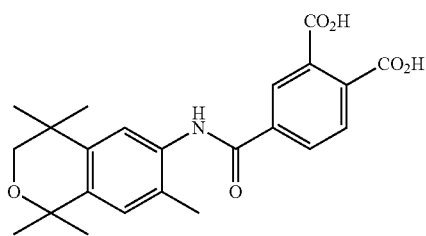

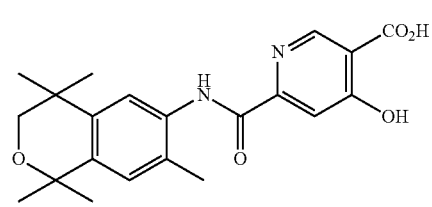
39
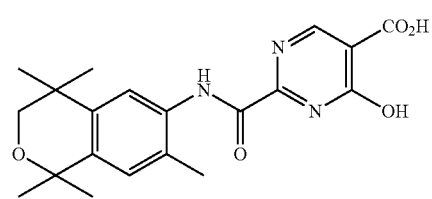
40
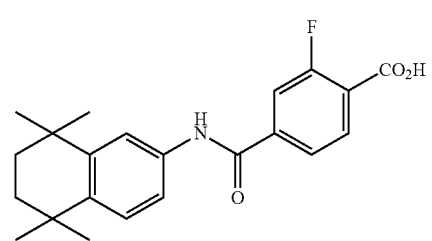
41
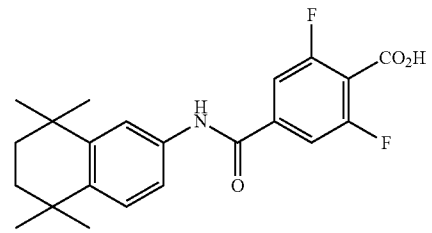
42
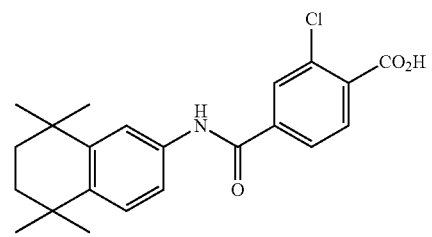
43
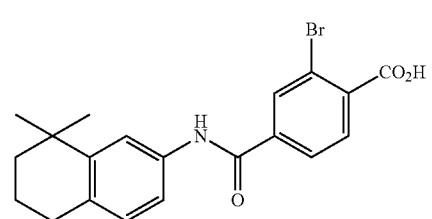
44
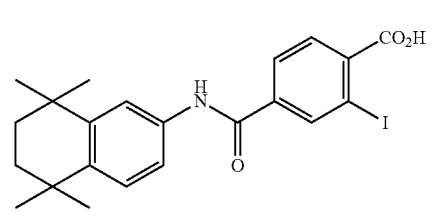
45
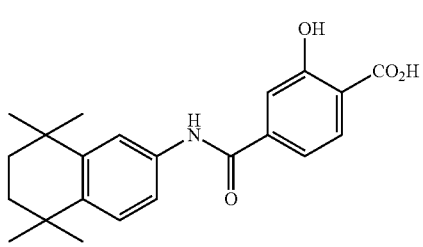
46
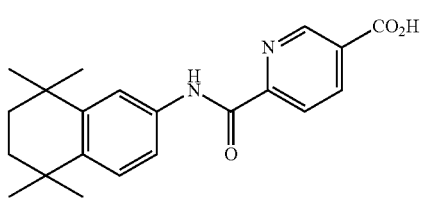
47
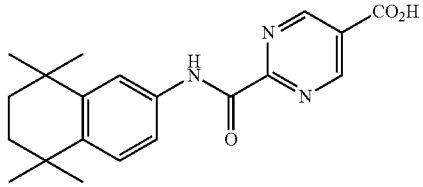
48
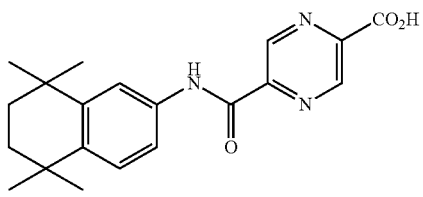
49
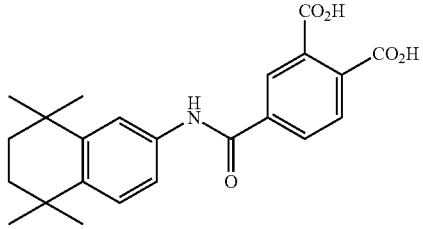
50
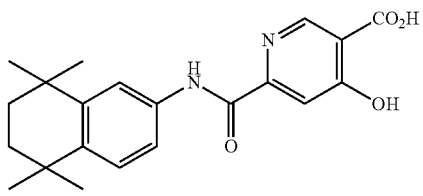
51
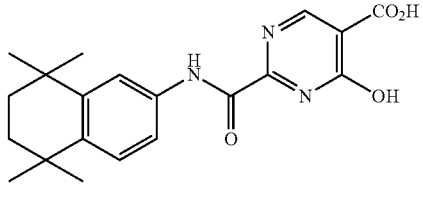
52
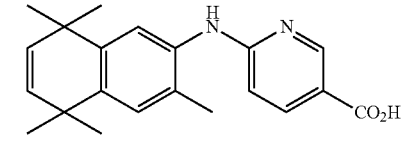
53

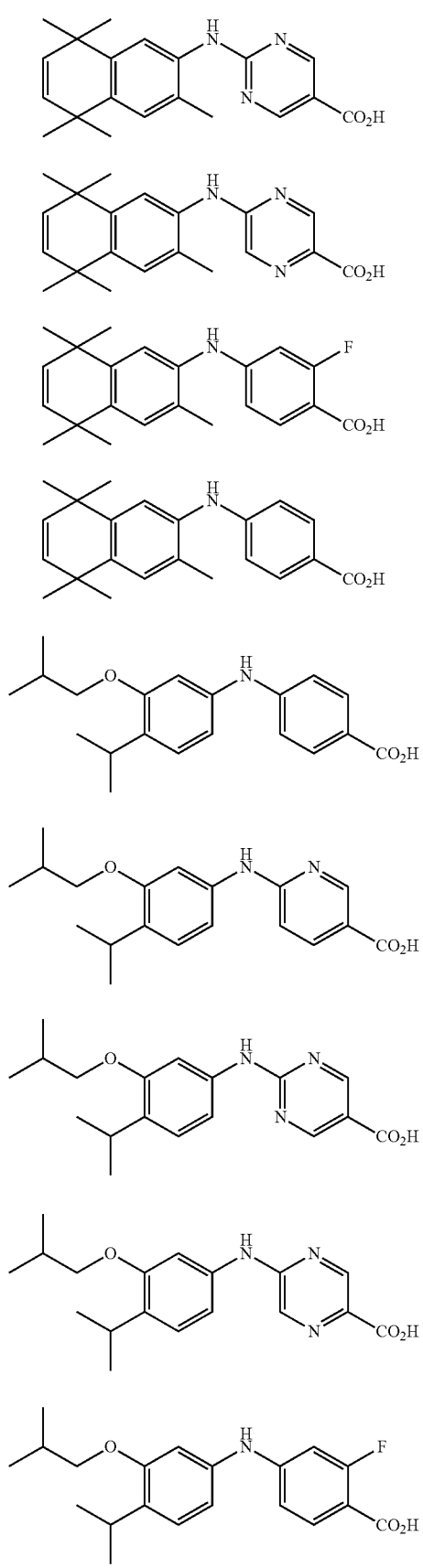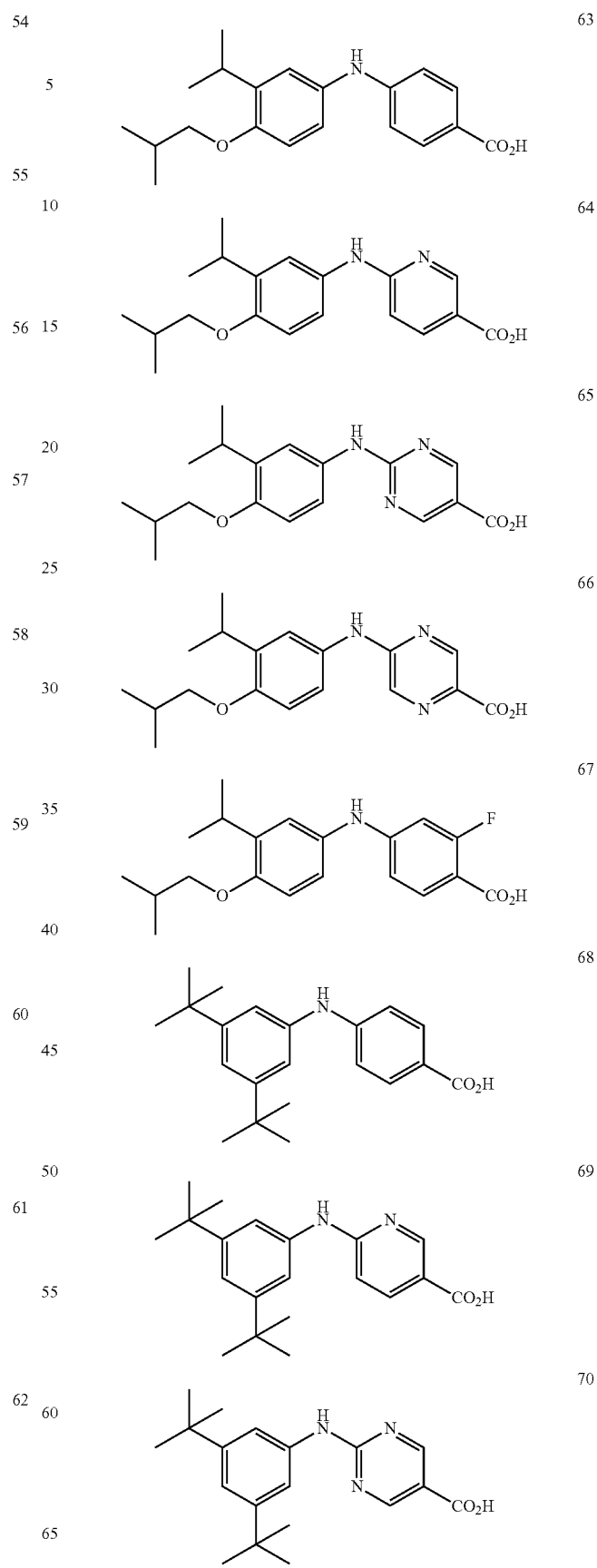

71 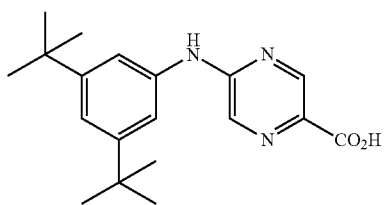
72 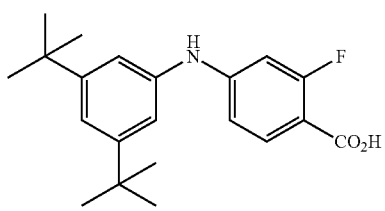
73 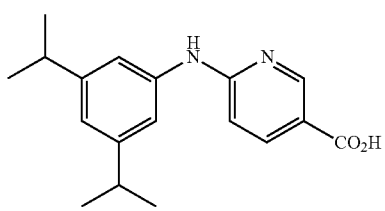
74 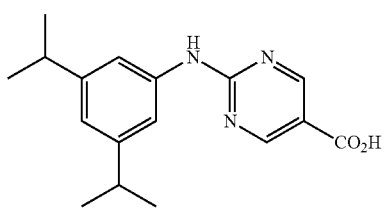
75 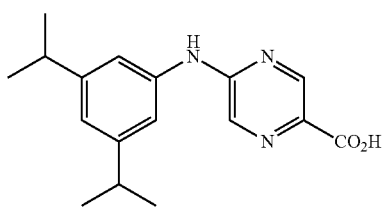
76 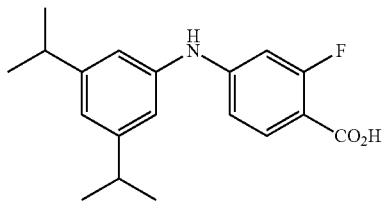
77 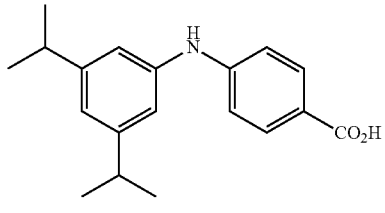
78 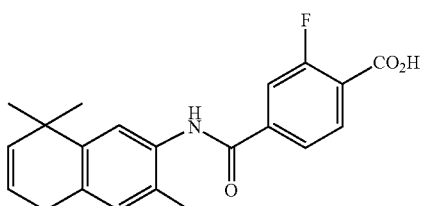
79 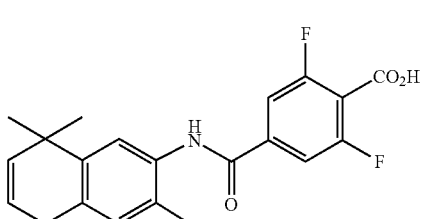
80 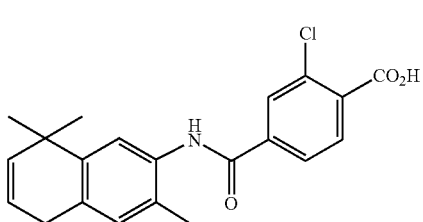
81 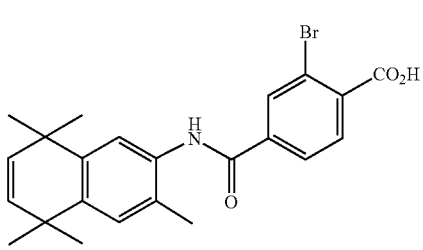
82 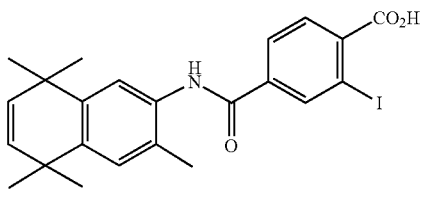
83 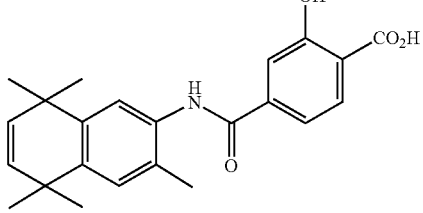
84 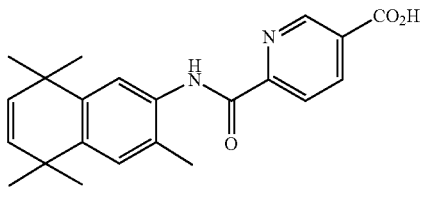

85 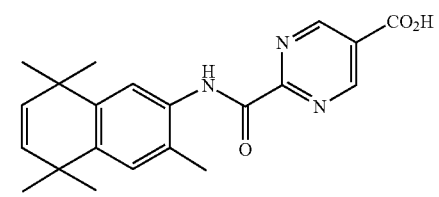
86 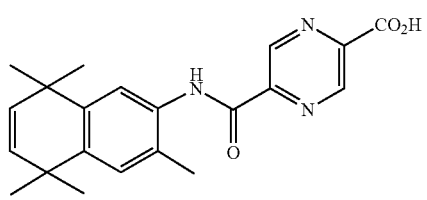
87 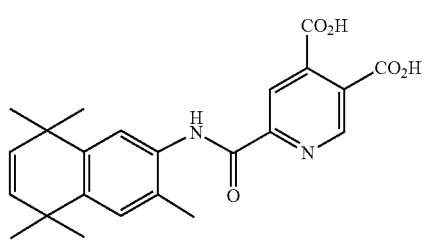
88 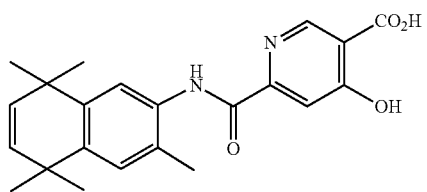
89 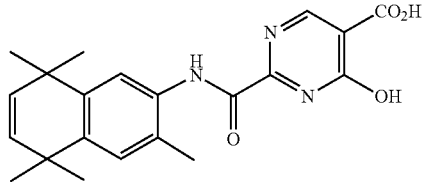
90 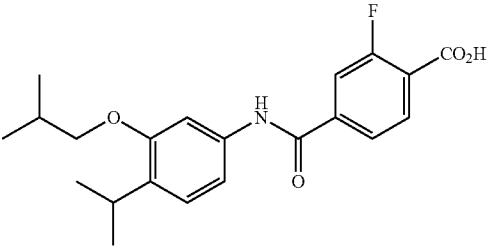
91 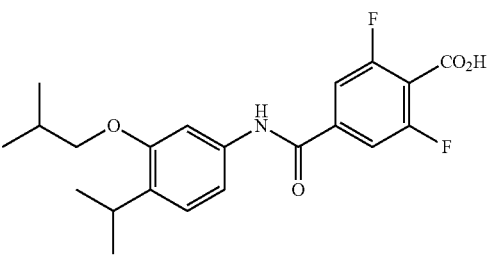
92 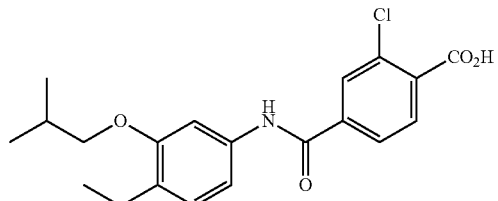
93 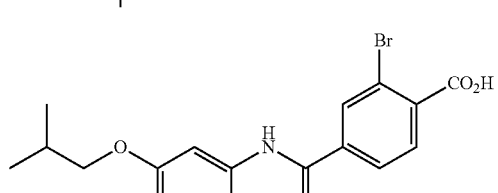
94 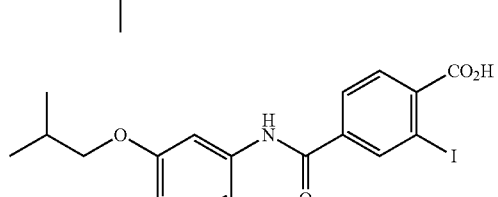
95 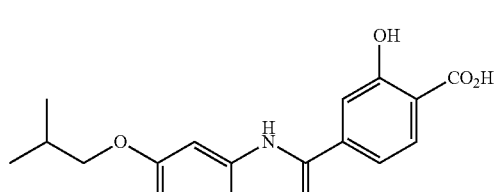
96 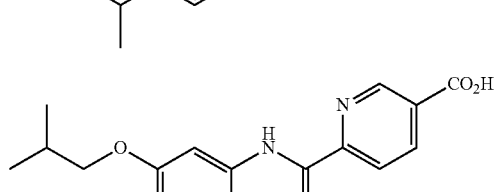
97 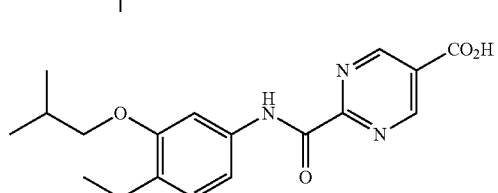
98 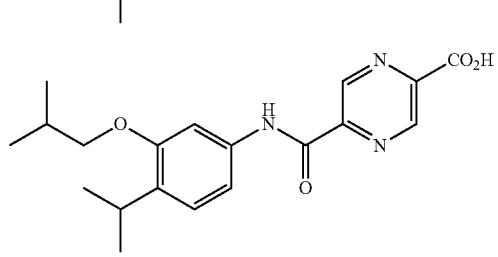

39
-continued
99
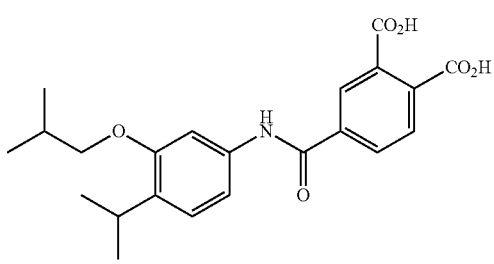
100
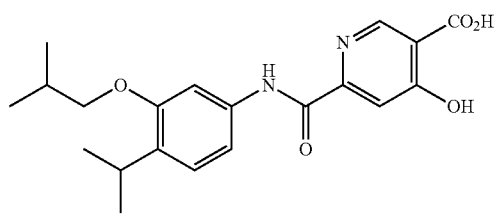
101
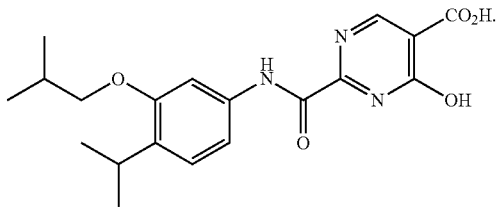
In one embodiment the compound of formula (1) is
3
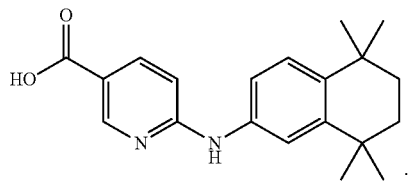
In one embodiment the compound of formula (1) is
4
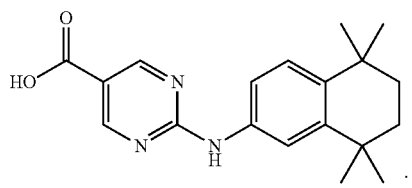
In one embodiment, the compound of formula (1) is
7
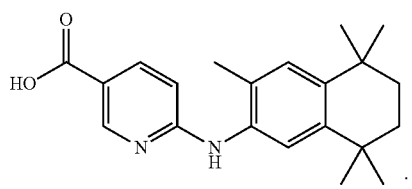
40
In one embodiment, the compound of formula (1) is
15
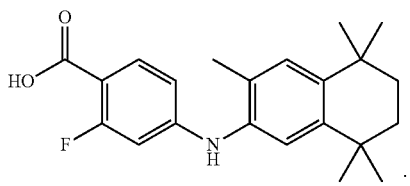
In one embodiment, the compound of formula (1) is
15
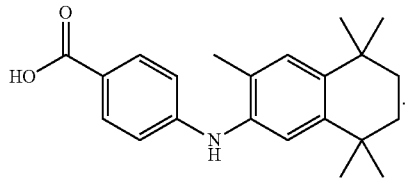
In one embodiment, the compound of formula (1) is not a compound selected from the group consisting of:
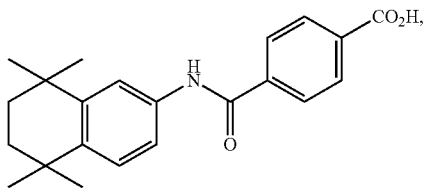
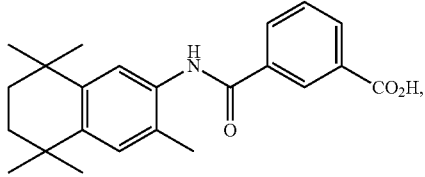
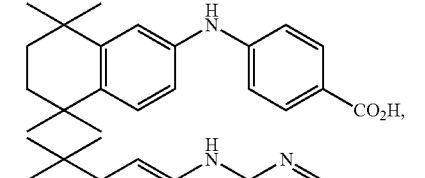
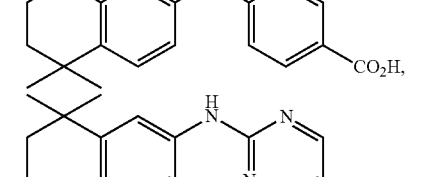
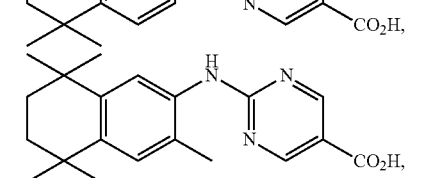
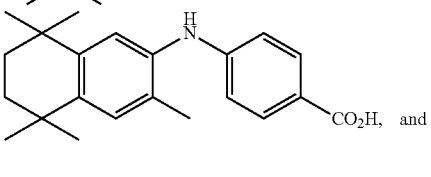
and

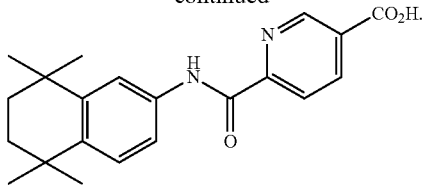

In one embodiment, the compounds of formula (1) are RXR agonists. In one embodiment, the compounds of formula (1) are RAR agonists. In one embodiment, the compounds of formula (1) are dual RXR and RAR agonists.

In one embodiment, the compound of formula (1) is a compound of formula (2), or a pharmaceutically acceptable salt, solvate, hydrate or stereoisomer thereof:

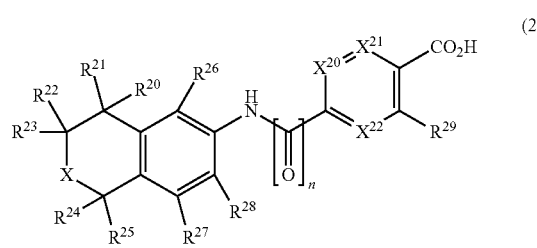

(2)

wherein $X^{20}$-$X^{22}$ are each independently N or $CR^{210}$, and at least one of $X^{20}$-$X^{22}$ is $CR^{210}$;

wherein $R^{20}$-$R^{28}$ are each independently hydrogen or —$C_1$-$C_6$ alkyl;

wherein $R^{29}$ and $R^{210}$ are each independently selected from the group consisting of: hydrogen, halogen, —OH, and —$CO_2H$;

wherein X is O or CRR';

wherein R and R' are each independently hydrogen or —$C_1$-$C_6$ alkyl; and wherein n is 0 or 1.

In one embodiment, $R^{20}$, $R^{21}$, $R^{24}$, and $R^{25}$ are each independently a —$C_1$-$C_6$ alkyl. In one embodiment, $R^{20}$, $R^{21}$, $R^{24}$, and $R^{25}$ are each independently a —$C_1$-$C_6$ linear alkyl. In one embodiment, $R^{20}$, $R^{21}$, $R^{24}$, and $R^{25}$ are each independently selected from the group consisting of methyl, ethyl, propyl, isopropyl, n-butyl, iso-butyl, t-butyl, n-pentyl, and n-hexyl. In one embodiment, $R^{20}$, $R^{21}$, $R^{24}$, and $R^{25}$ are each methyl.

In one embodiment, $R^{22}$ is hydrogen.
In one embodiment, $R^{23}$ is hydrogen.
In one embodiment, $R^{26}$ is hydrogen.
In one embodiment, $R^{26}$ is a —$C_1$-$C_6$ alkyl. In one embodiment, $R^{26}$ is a —$C_1$-$C_6$ linear alkyl. In one embodiment, $R^{26}$ is selected from the group consisting of methyl, ethyl, propyl, isopropyl, n-butyl, iso-butyl, t-butyl, n-pentyl, and n-hexyl. In one embodiment, $R^{26}$ is methyl.
In one embodiment, $R^{27}$ is hydrogen.
In one embodiment, $R^{28}$ is hydrogen.
In one embodiment $R^{28}$ is a —$C_1$-$C_6$ alkyl. In one embodiment, $R^{28}$ is a —$C_1$-$C_6$ linear alkyl. In one embodiment $R^{28}$ is selected from the group consisting of methyl, ethyl, propyl, isopropyl, n-butyl, iso-butyl, t-butyl, n-pentyl, and n-hexyl. In one embodiment, $R^{28}$ is methyl.
In one embodiment, $R^{29}$ is hydrogen.
In one embodiment, $R^{29}$ is —$CO_2H$.
In one embodiment, $R^{29}$ is —OH.
In one embodiment, $R^{29}$ is a halogen. In one embodiment $R^{29}$ is Br. In one embodiment, $R^{29}$ is Cl. In one embodiment, $R^{29}$ is F. In one embodiment, $R^{29}$ is I.

In one embodiment, $R^{210}$ is hydrogen.
In one embodiment, $R^{210}$ is —$CO_2H$.
In one embodiment, $R^{210}$ is —OH.
In one embodiment, $R^{210}$ is a halogen. In one embodiment $R^{210}$ is Br. In one embodiment, $R^{210}$ is Cl. In one embodiment, $R^{210}$ is F. In one embodiment, $R^{210}$ is I.

In one embodiment, each of $X^{20}$-$X^{22}$ is independently $CR^{210}$. In one embodiment, $X^{20}$ is $CR^{210}$ wherein $R^{210}$ is hydrogen. In one embodiment, $X^{22}$ is $CR^{210}$ wherein $R^{210}$ is hydrogen.

In one embodiment, $X^{20}$ is N, $X^{21}$ is $CR^{210}$, and $X^{22}$ is $CR^{210}$. In one embodiment, $X^{22}$ is $CR^{210}$ wherein $R^{210}$ is hydrogen.

In one embodiment, $X^{20}$ is N, $X^{21}$ is $CR^{210}$, and $X^{22}$ is $CR^{210}$. In one embodiment, $X^{22}$ is $CR^{210}$ wherein $R^{210}$ is hydrogen.

In one embodiment, $X^{20}$ is $CR^{210}$, $X^{21}$ is $CR^{210}$, and $X^{22}$ is N. In one embodiment, $X^{20}$ is $CR^{210}$ wherein $R^{210}$ is hydrogen.

In one embodiment, $X^{20}$ is N, $X^{21}$ is $CR^{210}$, and $X^{22}$ is N.
In one embodiment, $X^{20}$ is $CR^{210}$, $X^{21}$ is N, and $X^{22}$ is N. In one embodiment, $X^{20}$ is $CR^{210}$ wherein $R^{210}$ is hydrogen.

In one embodiment, X is O.
In one embodiment, X is CRR'. In one embodiment, R and R' are each hydrogen.
In one embodiment, n is 0.
In one embodiment, n is 1.
In one embodiment, the compound of formula (1) is a compound of formula (3), or a pharmaceutically acceptable salt, solvate, hydrate or stereoisomer thereof:

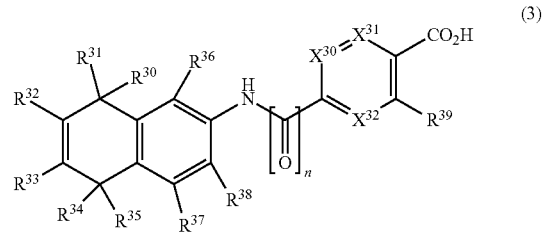

(3)

wherein $X^{30}$-$X^{32}$ are each independently N or $CR^{310}$, and at least one of $X^{30}$-$X^{32}$ is $CR^{310}$;

wherein $R^{30}$-$R^{38}$ are each independently hydrogen or —$C_1$-$C_6$ alkyl;

wherein $R^{39}$ and $R^{310}$ are each independently selected from the group consisting of: hydrogen, halogen, —OH, and —$CO_2H$; and wherein n is 0 or 1.

In one embodiment, $R^{30}$, $R^{31}$, $R^{34}$, and $R^{35}$ are each independently a —$C_1$-$C_6$ alkyl. In one embodiment, $R^{30}$, $R^{31}$, $R^{34}$, and $R^{35}$ are each independently a —$C_1$-$C_6$ linear alkyl selected from the group consisting of methyl, ethyl, propyl, n-butyl, n-pentyl, and n-hexyl. In one embodiment, $R^{30}$, $R^{31}$, $R^{34}$, and $R^{35}$ are each methyl.

In one embodiment, $R^{32}$ is hydrogen.
In one embodiment, $R^{33}$ is hydrogen.
In one embodiment, $R^{36}$ is hydrogen.
In one embodiment, $R^{37}$ is hydrogen.
In one embodiment, $R^{38}$ is hydrogen.
In one embodiment $R^{38}$ is a —$C_1$-$C_6$ alkyl. In one embodiment, $R^{38}$ is a —$C_1$-$C_6$ linear alkyl selected from the group consisting of methyl, ethyl, propyl, n-butyl, n-pentyl, and n-hexyl. In one embodiment, $R^{38}$ is methyl.

In one embodiment, $R^{39}$ is hydrogen.
In one embodiment, $R^{39}$ is —$CO_2H$.
In one embodiment, $R^{39}$ is —OH.
In one embodiment, $R^{39}$ is a halogen. In one embodiment $R^{39}$ is Br. In one embodiment, $R^{39}$ is Cl. In one embodiment, $R^{39}$ is F. In one embodiment, $R^{39}$ is I.
In one embodiment, $R^{310}$ is hydrogen.
In one embodiment, $R^{310}$ is —$CO_2H$.
In one embodiment, $R^{310}$ is —OH.
In one embodiment, $R^{310}$ is a halogen. In one embodiment $R^{310}$ is Br. In one embodiment, $R^{310}$ is Cl. In one embodiment, $R^{310}$ is F. In one embodiment, $R^{310}$ is I.
In one embodiment, each of $X^{30}$-$X^{32}$ is independently $CR^{310}$. In one embodiment, $X^{30}$ is $CR^{310}$ wherein $R^{310}$ is hydrogen. In one embodiment, $X^{32}$ is $CR^{310}$ wherein $R^{310}$ is hydrogen.
In one embodiment, $X^{30}$ is N, $X^{31}$ is $CR^{310}$, and $X^{32}$ is $CR^{310}$. In one embodiment, $X^{32}$ is $CR^{310}$ wherein $R^{310}$ is hydrogen.
In one embodiment, $X^{30}$ is N, $X^{31}$ is $CR^{310}$, and $X^{32}$ is $CR^{310}$. In one embodiment, $X^{32}$ is $CR^{310}$ wherein $R^{310}$ is hydrogen.
In one embodiment, $X^{30}$ is $CR^{310}$, $X^{31}$ is $CR^{310}$, and $X^{32}$ is N. In one embodiment, $X^{30}$ is $CR^{310}$ wherein $R^{310}$ is hydrogen.
In one embodiment, $X^{30}$ is N, $X^{31}$ is $CR^{310}$, and $X^{32}$ is N.
In one embodiment, $X^{30}$ is $CR^{310}$, $X^{31}$ is N, and $X^{32}$ is N. In one embodiment, $X^{30}$ is $CR^{310}$ wherein $R^{310}$ is hydrogen.
In one embodiment, n is 0.
In one embodiment, n is 1.
In one embodiment, the compound of formula (1) is a compound of formula (4), or a pharmaceutically acceptable salt, solvate, hydrate or stereoisomer thereof:

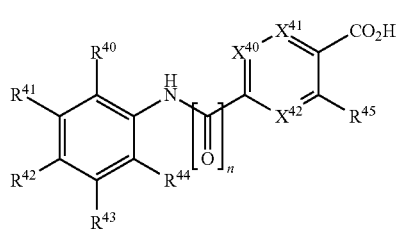

(4)

wherein $X^{40}$-$X^{42}$ are each independently N or $CR^{46}$, and at least one of $X^{40}$-$X^{42}$ is $CR^{46}$;
wherein $R^{40}$-$R^{44}$ are each independently hydrogen, —$C_1$-$C_6$ alkyl, or —$OR^{47}$;
wherein $R^{45}$ and $R^{46}$ are each independently selected from the group consisting of: hydrogen, halogen, —OH, and —$CO_2H$;
wherein each $R^{47}$ is independently —$C_1$-$C_6$ alkyl; and
wherein n is 0 or 1.
In one embodiment, two adjacent $R^{40}$-$R^{44}$ or two adjacent $R^{46}$ cannot join to form a ring.
In one embodiment, $R^{40}$ is hydrogen.
In one embodiment, $R^{41}$ is hydrogen.
In one embodiment, $R^{41}$ is —$C_1$-$C_6$ alkyl. In one embodiment, $R^{41}$ is a —$C_1$-$C_6$ alkyl is a branched alkyl. In one embodiment, $R^{41}$ is a branched alkyl selected from the group consisting of isopropyl, isobutyl, sec-butyl, tert-butyl, isopentyl, neopentyl, 2-methylpentyl, 3-methylpentyl, 2,3-dimethylbutyl, and 2,2-dimethylbutyl. In one embodiment, $R^{51}$ is isopropyl. In one embodiment, $R^{41}$ is tert-butyl.
In one embodiment, $R^{41}$ is —$OR^{47}$ wherein $R^{47}$ is a —$C_1$-$C_6$ alkyl. In one embodiment, $R^{47}$ is a —$C_1$-$C_6$ branched alkyl. In one embodiment, $R^{47}$ is a —$C_1$-$C_6$ branched alkyl selected from the group consisting of isopropyl, isobutyl, sec-butyl, tert-butyl, isopentyl, neopentyl, 2-methylpentyl, 3-methylpentyl, 2,3-dimethylbutyl, and 2,2-dimethylbutyl. In one embodiment, $R^{47}$ is isobutyl.
In one embodiment, $R^{42}$ is hydrogen.
In one embodiment, $R^{42}$ is —$C_1$-$C_6$ alkyl. In one embodiment, $R^{42}$ is a —$C_1$-$C_6$ alkyl is a branched alkyl. In one embodiment, $R^{42}$ is a branched alkyl selected from the group consisting of selected from the group consisting of: isopropyl, isobutyl, sec-butyl, tert-butyl, isopentyl, neopentyl, 2-methylpentyl, 3-methylpentyl, 2,3-dimethylbutyl, and 2,2-dimethylbutyl. In one embodiment, $R^{42}$ is isopropyl. In one embodiment, $R^{42}$ is tert-butyl.
In one embodiment, $R^{42}$ is —$OR^{47}$ wherein $R^{47}$ is a —$C_1$-$C_6$ alkyl. In one embodiment, $R^{47}$ is a —$C_1$-$C_6$ branched alkyl. In one embodiment, $R^{47}$ is a —$C_1$-$C_6$ branched alkyl selected from the group consisting of isopropyl, isobutyl, sec-butyl, tert-butyl, isopentyl, neopentyl, 2-methylpentyl, 3-methylpentyl, 2,3-dimethylbutyl, and 2,2-dimethylbutyl. In one embodiment, $R^{47}$ is isobutyl.
In one embodiment, $R^{43}$ is hydrogen.
In one embodiment, $R^{43}$ is —$C_1$-$C_6$ alkyl. In one embodiment, $R^{43}$ is a —$C_1$-$C_6$ alkyl is a branched alkyl. In one embodiment, $R^{43}$ is a branched alkyl selected from the group consisting of isopropyl, isobutyl, sec-butyl, tert-butyl, isopentyl, neopentyl, 2-methylpentyl, 3-methylpentyl, 2,3-dimethylbutyl, and 2,2-dimethylbutyl. In one embodiment, $R^{43}$ is isopropyl. In one embodiment, $R^{43}$ is tert-butyl.
In one embodiment, $R^{43}$ is —$OR^{47}$ wherein $R^{47}$ is a —$C_1$-$C_6$ alkyl. In one embodiment, $R^{47}$ is a —$C_1$-$C_6$ branched alkyl. In one embodiment, $R^{47}$ is a —$C_1$-$C_6$ branched alkyl selected from the group consisting of isopropyl, isobutyl, sec-butyl, tert-butyl, isopentyl, neopentyl, 2-methylpentyl, 3-methylpentyl, 2,3-dimethylbutyl, and 2,2-dimethylbutyl. In one embodiment, $R^{47}$ is isobutyl.
In one embodiment, $R^{44}$ is hydrogen.
In one embodiment, $R^{45}$ is hydrogen.
In one embodiment, $R^{45}$ is —$CO_2H$.
In one embodiment, $R^{45}$ is —OH.
In one embodiment, $R^{45}$ is a halogen. In one embodiment $R^{45}$ is Br. In one embodiment, $R^{45}$ is Cl. In one embodiment, $R^{45}$ is F. In one embodiment, $R^{45}$ is I.
In one embodiment, $R^{46}$ is hydrogen.
In one embodiment, $R^{46}$ is —$CO_2H$.
In one embodiment, $R^{46}$ is —OH.
In one embodiment, $R^{46}$ is a halogen. In one embodiment $R^{46}$ is Br. In one embodiment, $R^{46}$ is Cl. In one embodiment, $R^{46}$ is F. In one embodiment, $R^{46}$ is I.
In one embodiment, each of $X^{40}$-$X^{42}$ is independently $CR^{46}$. In one embodiment, $X^{40}$ is $CR^{46}$ wherein $R^{46}$ is hydrogen. In one embodiment, $X^{42}$ is $CR^{46}$ wherein $R^{46}$ is hydrogen.
In one embodiment, $X^{40}$ is N, $X^{41}$ is $CR^{46}$, and $X^{42}$ is $CR^{46}$. In one embodiment, $X^{42}$ is $CR^{46}$ wherein $R^{46}$ is hydrogen.
In one embodiment, $X^{40}$ is N, $X^{41}$ is $CR^{46}$, and $X^{42}$ is $CR^{46}$. In one embodiment, $X^{42}$ is $CR^{46}$ wherein $R^{46}$ is hydrogen.
In one embodiment, $X^{40}$ is $CR^{46}$, $X^{41}$ is $CR^{46}$, and $X^{42}$ is N. In one embodiment, $X^{40}$ is $CR^{46}$ wherein $R^{46}$ is hydrogen.
In one embodiment, $X^{40}$ is N, $X^{41}$ is $CR^{46}$, and $X^{42}$ is N.
In one embodiment, $X^{40}$ is $CR^{46}$, $X^{41}$ is N, and $X^{42}$ is N. In one embodiment, $X^{40}$ is $CR^{46}$ wherein $R^{46}$ is hydrogen.

In one embodiment, $R^{40}$ is hydrogen, $R^{41}$ is —$C_1$-$C_6$alkyl, $R^{42}$ is hydrogen, $R^{43}$ is —$C_1$-$C_6$ alkyl, and $R^{44}$ is hydrogen.

In one embodiment, $R^{40}$ is hydrogen, $R^{41}$ is —$OR^{47}$, $R^{42}$ is —$C_1$-$C_6$ alkyl, $R^{43}$ is hydrogen, and $R^{44}$ is hydrogen.

In one embodiment, $R^{40}$ is hydrogen, $R^{41}$ is —$C_1$-$C_6$ alkyl, $R^{42}$ is —$OR^{47}$, $R^{43}$ is hydrogen, and $R^{44}$ is hydrogen.

In one embodiment, n is 0.

In one embodiment, n is 1.

The compounds of the invention may possess one or more stereocenters, and each stereocenter may exist independently in either the R or S configuration. In one embodiment, compounds described herein are present in optically active or racemic forms. It is to be understood that the compounds described herein encompass racemic, optically-active, regioisomeric and stereoisomeric forms, or combinations thereof that possess the therapeutically useful properties described herein. Preparation of optically active forms is achieved in any suitable manner, including by way of non-limiting example, by resolution of the racemic form with recrystallization techniques, synthesis from optically-active starting materials, chiral synthesis, or chromatographic separation using a chiral stationary phase. In one embodiment, a mixture of one or more isomer is utilized as the therapeutic compound described herein. In another embodiment, compounds described herein contain one or more chiral centers. These compounds are prepared by any means, including stereoselective synthesis, enantioselective synthesis and/or separation of a mixture of enantiomers and/or diastereomers. Resolution of compounds and isomers thereof is achieved by any means including, by way of non-limiting example, chemical processes, enzymatic processes, fractional crystallization, distillation, and chromatography.

The methods and formulations described herein include the use of N-oxides (if appropriate), crystalline forms (also known as polymorphs), solvates, amorphous phases, and/or pharmaceutically acceptable salts of compounds having the structure of any compound of the invention, as well as metabolites and active metabolites of these compounds having the same type of activity. Solvates include water, ether (e.g., tetrahydrofuran, methyl tert-butyl ether) or alcohol (e.g., ethanol) solvates, acetates and the like. In one embodiment, the compounds described herein exist in solvated forms with pharmaceutically acceptable solvents such as water, and ethanol. In another embodiment, the compounds described herein exist in unsolvated form.

In one embodiment, the compounds of the invention may exist as tautomers. All tautomers are included within the scope of the compounds presented herein.

In one embodiment, sites on, for example, the aromatic ring portion of compounds of the invention are susceptible to various metabolic reactions. Incorporation of appropriate substituents on the aromatic ring structures may reduce, minimize or eliminate this metabolic pathway. In one embodiment, the appropriate substituent to decrease or eliminate the susceptibility of the aromatic ring to metabolic reactions is, by way of example only, a deuterium, a halogen, or an alkyl group.

Compounds described herein also include isotopically-labeled compounds wherein one or more atoms is replaced by an atom having the same atomic number, but an atomic mass or mass number different from the atomic mass or mass number usually found in nature. Examples of isotopes suitable for inclusion in the compounds described herein include and are not limited to $^2$H, $^3$H, $^{11}$C, $^{13}$C, $^{14}$C, $^{36}$Cl, $^{18}$F, $^{123}$I, $^{125}$I, $^{13}$N, $^{15}$N, $^{15}$O, $^{17}$O, $^{18}$O, $^{32}$P, and $^{35}$S. In one embodiment, isotopically-labeled compounds are useful in drug and/or substrate tissue distribution studies. In another embodiment, substitution with heavier isotopes such as deuterium affords greater metabolic stability (for example, increased in vivo half-life or reduced dosage requirements). In yet another embodiment, substitution with positron emitting isotopes, such as $^{11}$C, $^{18}$F, $^{15}$O and $^{13}$N, is useful in Positron Emission Topography (PET) studies for examining substrate receptor occupancy. Isotopically-labeled compounds are prepared by any suitable method or by processes using an appropriate isotopically-labeled reagent in place of the non-labeled reagent otherwise employed.

In one embodiment, the compounds described herein are labeled by other means, including, but not limited to, the use of chromophores or fluorescent moieties, bioluminescent labels, or chemiluminescent labels.

The compounds described herein, and other related compounds having different substituents are synthesized using techniques and materials described herein. General methods for the preparation of compound as described herein are modified by the use of appropriate reagents and conditions, for the introduction of the various moieties found in the formula as provided herein.

Compounds described herein are synthesized using any suitable procedures starting from compounds that are available from commercial sources.

In one embodiment, reactive functional groups, such as hydroxyl, amino, imino, thio or carboxy groups, are protected in order to avoid their unwanted participation in reactions. Protecting groups are used to block some or all of the reactive moieties and prevent such groups from participating in chemical reactions until the protective group is removed. In another embodiment, each protective group is removable by a different means. Protective groups that are cleaved under totally disparate reaction conditions fulfill the requirement of differential removal.

In one embodiment, protective groups are removed by acid, base, reducing conditions (such as, for example, hydrogenolysis), and/or oxidative conditions. Groups such as trityl, dimethoxytrityl, acetal and t-butyldimethylsilyl are acid labile and are used to protect carboxy and hydroxy reactive moieties in the presence of amino groups protected with Cbz groups, which are removable by hydrogenolysis, and Fmoc groups, which are base labile. Carboxylic acid and hydroxy reactive moieties are blocked with base labile groups such as, but not limited to, methyl, ethyl, and acetyl, in the presence of amines that are blocked with acid labile groups, such as t-butyl carbamate, or with carbamates that are both acid and base stable but hydrolytically removable.

In one embodiment, carboxylic acid and hydroxy reactive moieties are blocked with hydrolytically removable protective groups such as the benzyl group, while amine groups capable of hydrogen bonding with acids are blocked with base labile groups such as Fmoc. Carboxylic acid reactive moieties are protected by conversion to simple ester compounds as exemplified herein, which include conversion to alkyl esters, or are blocked with oxidatively-removable protective groups such as 2,4-dimethoxybenzyl, while co-existing amino groups are blocked with fluoride labile silyl carbamates.

Allyl blocking groups are useful in the presence of acid- and base-protecting groups since the former are stable and are subsequently removed by metal or pi-acid catalysts. For example, an allyl-blocked carboxylic acid is deprotected with a palladium-catalyzed reaction in the presence of acid labile t-butyl carbamate or base-labile acetate amine protecting groups. Yet another form of protecting group is a resin to which a compound or intermediate is attached. As long as the residue is attached to the resin, that functional group is blocked and does not react. Once released from the resin, the functional group is available to react.

Typically blocking/protecting groups may be selected from:

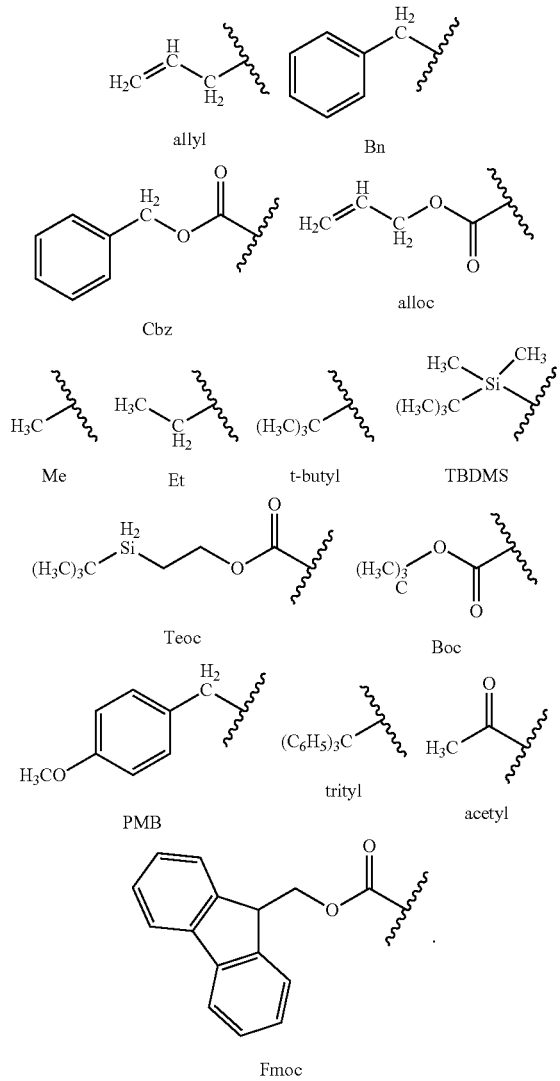

Methods

In one aspect, the invention provides methods of activating a retinoid X receptor (RXR) in a subject in need thereof. In one embodiment, the method comprises the step of administering an effective amount of a composition comprising a compound of formula (1). In one embodiment, the method comprises the step of administering an effective amount of a composition comprising a compound of formula (2). In one embodiment, the method comprises the step of administering an effective amount of a composition comprising a compound of formula (3). In one embodiment, the method comprises the step of administering an effective amount of a composition comprising a compound of formula (4). In one embodiment, the RXR is RXR-alpha. In one embodiment, the RXR is RXR-beta. In one embodiment, the RXR is RXR-gamma.

In one embodiment, the invention provides methods of activating a retinoic acid receptor (RAR) in a subject in need thereof. In one embodiment, the method comprises the step of administering an effective amount of a composition comprising a compound of formula (1). In one embodiment, the method comprises the step of administering an effective amount of a composition comprising a compound of formula (2). In one embodiment, the method comprises the step of administering an effective amount of a composition comprising a compound of formula (3). In one embodiment, the method comprises the step of administering an effective amount of a composition comprising a compound of formula (4). In one embodiment, the RAR is RAR-alpha. In one embodiment, the RAR is RAR-beta. In one embodiment, the RAR is RAR-gamma.

In one embodiment, the invention provides methods of activating both RXR and RAR in a subject in need thereof. In one embodiment, the method comprises the step of administering an effective amount of a composition comprising a compound of formula (1). In one embodiment, the method comprises the step of administering an effective amount of a composition comprising a compound of formula (2). In one embodiment, the method comprises the step of administering an effective amount of a composition comprising a compound of formula (3). In one embodiment, the method comprises the step of administering an effective amount of a composition comprising a compound of formula (4).

In one aspect, the invention provides a method of treating or preventing a disease or disorder associated with a decrease in the activity of RXR, RAR, or combinations thereof in a subject in need thereof.

As used herein, the term "disease or disorder associated with a decrease in the activity of RXR, RAR, or combinations thereof" refers to any disease, disorder, or condition which is caused or characterized by a decrease in the activity of RXR, RAR, or both RXR and RAR. Exemplary diseases or disorders associated with a decrease in the activity of RXR, RAR, or both RXR and RAR include, but are not limited to dementia, cancer, multiple sclerosis, Parkinson's disease, glaucoma, and multiform glioblastoma.

In one aspect, the invention provides a method of treating or preventing dementia in a subject in need thereof. In one embodiment, the method comprises administering to the subject an effective amount of a composition comprising a compound of the invention.

In one embodiment, dementia includes, but is not limited to, Alzheimer's disease, Lewy body dementia, vascular dementia, and fronto temporal dementia. In one embodiment, the dementia comprises Alzheimer's disease. In one embodiment, the Alzheimer's disease comprises early-onset Alzheimer's disease. In one embodiment, the Alzheimer's disease comprises late-onset Alzheimer's disease.

The method of the invention may be used to activate RXR, RAR, or a combination thereof or treat or prevent a disease or disorder associated with a decrease in the activity of RXR, RAR, or both RXR and RAR in any subject in need thereof. In one embodiment, the subject is a mammal, including, but not limited to, a human, primate, cow, horse, sheep, goat, dog, cat, rodent, and the like.

In one embodiment, the invention provides a method of treating or preventing cancer in a subject in need thereof. In one embodiment, the method comprises administering to the subject an effective amount of a composition comprising a compound of the invention. In one embodiment, cancer includes, but is not limited to, a solid tumor cancer and leukemia. In one embodiment, the cancer is leukemia. In one embodiment, the leukemia is cutaneous T-cell lymphoma. In one embodiment, the cutaneous T-cell lymphoma comprises mycosis fungoides. In one embodiment, the cutaneous T-cell lymphoma comprises Sezary Syndrome.

The composition of the invention may be administered to a patient or subject in need in a wide variety of ways. Modes of administration include intraoperatively intravenous, intravascular, intramuscular, subcutaneous, intracerebral, intraperitoneal, soft tissue injection, surgical placement, arthroscopic placement, and percutaneous insertion, e.g., direct injection, cannulation or catheterization. Any administration may be a single application of a composition of invention or multiple applications. Administrations may be to single site or to more than one site in the individual to be treated. Multiple administrations may occur essentially at the same time or separated in time.

In certain embodiments, the composition of the invention is administered in combination with one or more additional therapeutic agents. For example, the composition of the invention may be administered with anti-dementia agents or anti-cancer agents. In one embodiment, the composition of the invention may be administered with agents known to treat or prevent Alzheimer's disease. In one embodiment, the composition of the invention may be administered with agents known to treat or prevent cancer. In one embodiment, the composition of the invention may be administered with agents known to treat or prevent leukemia.

In one embodiment, the invention includes a method comprising administering a combination of the RXR agonists, RAR agonists, or both RXR and RAR agonists described herein. In certain embodiments, the method has an additive effect, wherein the overall effect of administering the combination of the RXR agonists, RAR agonists, or both RXR and RAR agonists is approximately equal to the sum of the effects of administering each individual agonist. In other embodiments, the method has a synergistic effect, wherein the overall effect of administering a combination of the RXR agonists, RAR agonists, or both RXR and RAR agonists is greater than the sum of the effects of administering each individual agonist. A synergistic effect may be calculated, for example, using suitable methods such as, for example, the Sigmoid-Emax equation, the equation of Loewe additivity and the median-effect equation. Each equation referred to above may be applied to experimental data to generate a corresponding graph to aid in assessing the effects of the drug combination. The corresponding graphs associated with the equations referred to above are the concentration-effect curve, isobologram curve and combination index curve, respectively.

The method comprises administering a combination of the RXR agonists, RAR agonists, or both RXR and RAR agonists in any suitable ratio. For example, in one embodiment, the method comprises administering three individual agonists at a 1:1:1 ratio. In one embodiment, the method comprises administering two individual agonists at a 1:1 ratio. However, the method is not limited to any particular ratio. Rather any ratio that is shown to be effective is encompassed.

Combination Therapies

The compounds of the present invention may be useful in combination with one or more additional compounds. In certain embodiments, these additional compounds may comprise compounds of the present invention or therapeutic agents which are known anti-dementia agents. In certain embodiments, the anti-dementia agent may comprise compounds useful for treating dementia. Such compounds include, but are not limited to, compounds which are known to treat, prevent, or reduce the symptoms of dementia. In one embodiment, the dementia comprises Alzheimer's disease.

In non-limiting examples, the compounds useful within the invention may be used in combination with one or more of the following Alzheimer's disease drugs: acetylcholinesterase inhibitors such as Aricept® (donepezil); butyrylcholinesterase inhibitors such as Exelon® (rivastigmine tartrate) and cymserine analogs, such as (−)-$N^1$-phenethylnorcymserine (PEC) and (−)-$N^1$,$N^8$-bisnorcymserine (BNC); acetylcholine receptor agonists such as TC-1734 (Targacept); NMDA receptor antagonists such as Memantine (Namenda® sold by Forest, Axura® sold by Merz, Akatinol® sold by Merz, Ebixa® sold by Lundbeck), Neramexane (Forest Labs), Amantadine, AP5 (2-amino-5-phosphonopentanoate, APV), Dextrorphan, Ketamine, MK-801 (dizocilpine), Phencyclidine, Riluzole and 7-chlorokynurenate; and inhibitors of amyloid Aβ peptides or amyloid plaques such as 3-amino-1-propanesulfonic acid (Tramiprosate, Alzhemed™) by Neurochem, Posiphen™ (Axonyx), Flurizan (Myriad), Kiacta or Fibrillex (NC-503, Eprodisate disodium, sodium 1,3-propanedisulfonate, 1,3-propanedisulphonic acid, 1,3-PDS), PBT-2 (Prana), Memryte (leuprolide) (Voyager), AN-1792 (Elan/Wyeth), AAB-001 (Elan/Wyeth), and ACC-001 (Elan/Wyeth).

In one embodiment, the invention includes a method comprising administering a combination of an RXR agonist, RAR agonist, or a dual RAR/RXR agonist of the invention as described elsewhere herein and an anti-Alzheimer's disease agent. In certain embodiments, the method has an additive effect, wherein the overall effect of the administering the combination of a compound of the invention and an anti-Alzheimer's disease agent is approximately equal to the sum of the effects of administering each individually. In other embodiments, the method has a synergistic effect, wherein the overall effect of administering a combination of compound of the invention and an anti-Alzheimer's disease agent is greater than the sum of the effects of administering each individually. A synergistic effect may be calculated, for example, using suitable methods such as, for example, the Sigmoid-$E_{max}$ equation, the equation of Loewe additivity and the median-effect equation. Each equation referred to above may be applied to experimental data to generate a corresponding graph to aid in assessing the effects of the drug combination. The corresponding graphs associated with the equations referred to above are the concentration-effect curve, isobologram curve and combination index curve, respectively.

The compounds of the present invention may be useful in combination with one or more additional compounds. In certain embodiments, these additional compounds may comprise compounds of the present invention or therapeutic agents which are known anti-cancer agents. In certain embodiments, the anti-cancer agent may comprise compounds useful for treating cancer. Such compounds include, but are not limited to, compounds which are known to treat, prevent, or reduce the symptoms of cancer. In one embodiment, the cancer comprises leukemia.

In non-limiting examples, the compounds useful within the invention may be used in combination with one or more of the following cancer drugs: Arsenic Trioxide, Cerubidine (Daunorubicin Hydrochloride), Cyclophosphamide, Cytarabine, Cytosar-U (Cytarabine), Daunorubicin Hydrochloride, Daunorubicin Hydrochloride and Cytarabine Liposome, Daurismo (Glasdegib Maleate), Doxorubicin Hydrochloride, Enasidenib Mesylate, Gemtuzumab Ozogamicin, Gilteritinib Fumarate, Glasdegib Maleate, Idamycin PFS (Idarubicin Hydrochloride), Idarubicin Hydrochloride, Idhifa (Enasidenib Mesylate), Ivosidenib, Midostaurin, Mitoxantrone Hydrochloride, Mylotarg (Gemtuzumab Ozogamicin), Rubidomycin (Daunorubicin Hydrochloride), Rydapt (Midostaurin), Tabloid (Thioguanine), Tarabine PFS (Cytarabine), Thioguanine, Tibsovo (Ivosidenib), Trisenox (Arsenic Trioxide), Venclexta (Venetoclax), Venetoclax, Vincristine Sulfate, Vyxeos (Daunorubicin Hydrochloride and Cytarabine Liposome), Xospata (Gilteritinib Fumarate), All-trans-retinoic acid (ATRA, tretinoin, or Vesanoid); Taxanes, such as paclitaxel (Taxol), docetaxel (Taxotere), and albumin-bound paclitaxel (Abraxane); Anthracyclines (Doxorubicin, pegylated liposomal doxorubicin, and Epirubicin); Platinum agents (cisplatin, carboplatin); Vinorelbine (Navelbine); Capecitabine (Xeloda); Gemcitabine (Gemzar); Ixabepilone (Ixempra); Albumin-bound paclitaxel (nab-paclitaxel or Abraxane); and Eribulin (Halaven).

In one embodiment, the invention includes a method comprising administering a combination of an RXR agonist, RAR agonist, or a dual RAR/RXR agonist of the invention as described elsewhere herein and an anti-cancer agent. In certain embodiments, the method has an additive effect, wherein the overall effect of the administering the combination of a compound of the invention and an anti-cancer agent is approximately equal to the sum of the effects of administering each individually. In other embodiments, the method has a synergistic effect, wherein the overall effect of administering a combination of compound of the invention and an anti-cancer agent is greater than the sum of the effects of administering each individually. A synergistic effect may be calculated, for example, using suitable methods such as, for example, the Sigmoid-$E_{max}$ equation, the equation of Loewe additivity and the median-effect equation. Each equation referred to above may be applied to experimental data to generate a corresponding graph to aid in assessing the effects of the drug combination. The corresponding graphs associated with the equations referred to above are the concentration-effect curve, isobologram curve and combination index curve, respectively.

Administration/Dosage/Formulations

The regimen of administration may affect what constitutes an effective amount. The therapeutic formulations may be administered to the subject either before or after the onset of a disease or infection. Further, several divided dosages may be administered daily or sequentially, or the dose may be continuously infused, or may be a bolus injection. Further, the dosages of the therapeutic formulations may be proportionally increased or decreased as indicated by the exigencies of the therapeutic or prophylactic situation.

Administration of the compositions of the present invention to a patient, such as a mammal, (e.g., human), may be carried out using known procedures, at dosages and for periods of time effective to treat the disease or infection in the patient. An effective amount of the therapeutic compound necessary to achieve a therapeutic effect may vary according to factors such as the state of the disease or disorder in the patient; the age, sex, and weight of the patient; and the ability of the therapeutic compound to treat a disease or infection in the patient. Dosage regimens may be adjusted to provide the optimum therapeutic response. For example, several divided doses may be administered daily. In another example, the dose may be proportionally reduced as indicated by the exigencies of the therapeutic situation. A non-limiting example of an effective dose range for a therapeutic compound of the invention is from about 1 mg/kg to about 5,000 mg/kg of body weight/per day. One of ordinary skill in the art would be able to assess the relevant factors and make the determination regarding the effective amount of the therapeutic compound without undue experimentation.

Actual dosage levels of the active ingredients in the pharmaceutical compositions of this invention may be varied to obtain an amount of the active ingredient that is effective to achieve the desired therapeutic response for a particular patient, composition, and mode of administration, without generating excessive side effects in the patient.

In particular, the selected dosage level depends upon a variety of factors including the activity of the particular compound employed, the time of administration, the rate of excretion of the compound, the duration of the treatment, other drugs, compounds or materials used in combination with the compound, the age, sex, weight, condition, general health and prior medical history of the patient being treated, and like factors well, known in the medical arts.

A medical professional, e.g., physician or veterinarian, having ordinary skill in the art may readily determine and prescribe the effective amount of the pharmaceutical composition required. For example, the physician or veterinarian could start with a dosage of the compound of the invention in the pharmaceutical composition at a level that is lower than the level required to achieve the desired therapeutic effect, and then increase the dosage over time until the desired effect is achieved.

In particular embodiments, it is advantageous to formulate the compound in dosage unit form for ease of administration and uniformity of dosage. "Dosage unit form" as used herein refers to a physically discrete unit containing a predetermined quantity of therapeutic compound calculated to produce the desired therapeutic effect, in association with the required pharmaceutical vehicle. The dosage unit forms of the invention can be selected based upon (a) the unique characteristics of the therapeutic compound and the particular therapeutic effect to be achieved, and (b) the limitations inherent in the art of compounding/formulating such a therapeutic compound for the treatment of a disease or infection in a patient.

In one embodiment, the compositions of the invention are formulated using one or more pharmaceutically acceptable excipients or carriers. In one embodiment, the pharmaceutical compositions of the invention comprise a therapeutically effective amount of a compound of the invention and a pharmaceutically acceptable carrier.

The carrier may be a solvent or dispersion medium containing, for example, water, ethanol, polyol (for example, glycerol, propylene glycol, and liquid polyethylene glycol, and the like), vegetable oils, and suitable mixtures thereof. The proper fluidity may be maintained, for example, by the use of a coating such as lecithin, by the maintenance of the required particle size in the case of dispersion and by the use of surfactants. Prevention of the action of microorganisms may be achieved by various antibacterial and antifungal agents, for example, parabens, chlorobutanol, phenol, ascorbic acid, thimerosal, and the like. In some embodiments, it is useful to include isotonic agents, for example, sugars, sodium chloride, or polyalcohols such as mannitol and sorbitol, in the composition. Prolonged absorption of the injectable compositions can be achieved by including in the composition an agent which delays absorption, for example, aluminum monostearate or gelatin. In one embodiment, the pharmaceutically acceptable carrier is DMSO, alone or in combination with other carriers.

The therapeutically effective amount or dose of a compound of the present invention depends on the age, sex and weight of the patient, the current medical condition of the patient and the severity of the disease or infection in the patient being treated. The skilled artisan is able to determine appropriate doses depending on these and other factors.

The dose may be administered in a single dosage or in multiple dosages, for example from 1 to 4 or more times per day. When multiple dosages are used, the amount of each dosage may be the same or different. For example, a dose of 1 mg per day may be administered as two 0.5 mg doses, with about a 12-hour interval between doses.

Doses of the compound of the invention for administration may be in the range of from about 1 µg to about 10,000 mg, from about 20 µg to about 9,500 mg, from about 40 µg to about 9,000 mg, from about 75 µg to about 8,500 mg, from about 150 µg to about 7,500 mg, from about 200 µg to about 7,000 mg, from about 3050 µg to about 6,000 mg, from about 500 µg to about 5,000 mg, from about 750 µg to about 4,000 mg, from about 1 mg to about 3,000 mg, from about 10 mg to about 2,500 mg, from about 20 mg to about 2,000 mg, from about 25 mg to about 1,500 mg, from about 30 mg to about 1,000 mg, from about 40 mg to about 900 mg, from about 50 mg to about 800 mg, from about 60 mg to about 750 mg, from about 70 mg to about 600 mg, from about 80 mg to about 500 mg, and any and all whole or partial increments therebetween.

In some embodiments, the dose of a compound of the invention is from about 1 mg to about 2,500 mg. In some embodiments, a dose of a compound of the invention used in compositions described herein is less than about 10,000 mg, or less than about 8,000 mg, or less than about 6,000 mg, or less than about 5,000 mg, or less than about 3,000 mg, or less than about 2,000 mg, or less than about 1,000 mg, or less than about 500 mg, or less than about 200 mg, or less than about 50 mg. Similarly, in some embodiments, the dosage of a second compound as described elsewhere herein is less than about 1,000 mg, or less than about 800 mg, or less than about 600 mg, or less than about 500 mg, or less than about 400 mg, or less than about 300 mg, or less than about 200 mg, or less than about 100 mg, or less than about 50 mg, or less than about 40 mg, or less than about 30 mg, or less than about 25 mg, or less than about 20 mg, or less than about 15 mg, or less than about 10 mg, or less than about 5 mg, or less than about 2 mg, or less than about 1 mg, or less than about 0.5 mg, and any and all whole or partial increments thereof.

The compounds for use in the method of the invention may be formulated in unit dosage form. The term "unit dosage form" refers to physically discrete units suitable as unitary dosage for patients undergoing treatment, with each unit containing a predetermined quantity of active material calculated to produce the desired therapeutic effect, optionally in association with a suitable pharmaceutical carrier. The unit dosage form may be for a single daily dose or one of multiple daily doses (e.g., about 1 to 4 or more times per day). When multiple daily doses are used, the unit dosage form may be the same or different for each dose.

In one embodiment, the compositions of the invention are administered to the patient from about one to about five times per day or more. In various embodiments, the compositions of the invention are administered to the patient, 1-7 times per day, 1-7 times every two days, 1-7 times every 3 days, 1-7 times every week, 1-7 times every two weeks, and 1-7 times per month. It is readily apparent to one skilled in the art that the frequency of administration of the various combination compositions of the invention will vary from individual to individual depending on many factors including, but not limited to, age, the disease or disorder to be treated, the severity of the disease or disorder to be treated, gender, overall health, and other factors. Thus, the invention should not be construed to be limited to any particular dosing regime and the precise dosage and composition to be administered to any patient is determined by the medical professional taking all other factors about the patient into account.

In the case wherein the patient's status does improve, upon the doctor's discretion the administration of the inhibitor of the invention is optionally given continuously; alternatively, the dose of drug being administered is temporarily reduced or temporarily suspended for a certain length of time (i.e., a "drug holiday"). The length of the drug holiday optionally varies between 2 days and 1 year, including by way of example only, 2 days, 3 days, 4 days, 5 days, 6 days, 7 days, 10 days, 12 days, 15 days, 20 days, 28 days, 35 days, 50 days, 70 days, 100 days, 120 days, 150 days, 180 days, 200 days, 250 days, 280 days, 300 days, 320 days, 350 days, or 365 days. The dose reduction during a drug holiday includes from 10%-100%, including, by way of example only, 10%, 15%, 20%, 25%, 30%, 35%, 40%, 45%, 50%, 55%, 60%, 65%, 70%, 75%, 80%, 85%, 90%, 95%, or 100%.

Once improvement of the patient's condition has occurred, a maintenance dose is administered if necessary. Subsequently, the dosage or the frequency of administration, or both, may be reduced to a level at which the improved disease is retained. In some embodiments, a patient may require intermittent treatment on a long-term basis, or upon any recurrence of the disease or disorder.

Toxicity and therapeutic efficacy of such therapeutic regimens are optionally determined in cell cultures or experimental animals, including, but not limited to, the determination of the $LD_{50}$ (the dose lethal to 50% of the population) and the $ED_{50}$ (the dose therapeutically effective in 50% of the population). The dose ratio between the toxic and therapeutic effects is the therapeutic index, which is expressed as the ratio between $LD_{50}$ and $ED_{50}$. The data obtained from cell culture assays and animal studies are optionally used in formulating a range of dosage for use in human. The dosage of such compounds lies preferably within a range of circulating concentrations that include the $ED_{50}$ with minimal toxicity. The dosage optionally varies within this range depending upon the dosage form employed and the route of administration utilized.

In one embodiment, the present invention is directed to a packaged pharmaceutical composition comprising a container holding a therapeutically effective amount of a compound of the invention, alone or in combination with a second pharmaceutical agent; and instructions for using the compound to treat or prevent a disease or infection in a patient.

Formulations may be employed in admixtures with conventional excipients, i.e., pharmaceutically acceptable organic or inorganic carrier substances suitable for oral, parenteral, nasal, intravenous, subcutaneous, enteral, or any other suitable mode of administration, known to the art. The pharmaceutical preparations may be sterilized and if desired mixed with auxiliary agents, e.g., lubricants, preservatives, stabilizers, wetting agents, emulsifiers, salts for influencing osmotic pressure buffers, coloring, flavoring and/or aromatic substances and the like. They may also be combined where desired with other active agents, e.g., other analgesic agents.

Routes of administration of any of the compositions of the invention include oral, nasal, rectal, intravaginal, parenteral, buccal, sublingual or topical. The compounds for use in the invention may be formulated for administration by any suitable route, such as for oral or parenteral, for example, transdermal, transmucosal (e.g., sublingual, lingual, (trans) buccal, (trans)urethral, vaginal (e.g., trans- and perivaginally), (intra)nasal and (trans)rectal), intravesical, intrapulmonary, intraduodenal, intragastrical, intrathecal, subcutaneous, intramuscular, intradermal, intra-arterial, intravenous, intrabronchial, inhalation, and topical administration.

Suitable compositions and dosage forms include, for example, tablets, capsules, caplets, pills, gel caps, troches, dispersions, suspensions, solutions, syrups, granules, beads, transdermal patches, gels, powders, pellets, magmas, lozenges, creams, pastes, plasters, lotions, discs, suppositories, liquid sprays for nasal or oral administration, dry powder or aerosolized formulations for inhalation, compositions and formulations for parenteral administration and the like. It should be understood that the formulations and compositions that would be useful in the present invention are not limited to the particular formulations and compositions that are described herein.

Oral Administration

For oral administration, suitable forms include tablets, dragees, liquids, drops, suppositories, or capsules, caplets and gelcaps. The compositions formulated for oral use may be prepared according to any method known in the art and such compositions may contain one or more agents selected from the group consisting of inert, non-toxic pharmaceutically excipients that are suitable for the manufacture of tablets. Such excipients include, for example an inert diluent such as lactose; granulating and disintegrating agents such as cornstarch; binding agents such as starch; and lubricating agents such as magnesium stearate. The tablets may be uncoated or they may be coated by known techniques for elegance or to delay the release of the active ingredients. Formulations for oral use may also be presented as hard gelatin capsules wherein the active ingredient is mixed with an inert diluent.

For oral administration, the compounds of the invention may be in the form of tablets or capsules prepared by conventional means with pharmaceutically acceptable excipients such as binding agents (e.g., polyvinylpyrrolidone, hydroxypropylcellulose or hydroxypropylmethylcellulose); fillers (e.g., cornstarch, lactose, microcrystalline cellulose or calcium phosphate); lubricants (e.g., magnesium stearate, talc, or silica); disintegrates (e.g., sodium starch glycollate); or wetting agents (e.g., sodium lauryl sulphate). If desired, the tablets may be coated using suitable methods and coating materials such as OPADRY™ film coating systems available from Colorcon, West Point, Pa. (e.g., OPADRY™ OY Type, OYC Type, Organic Enteric OY-P Type, Aqueous Enteric OY-A Type, OY-PM Type and OPADRY™ White, 32K18400). Liquid preparation for oral administration may be in the form of solutions, syrups or suspensions. The liquid preparations may be prepared by conventional means with pharmaceutically acceptable additives such as suspending agents (e.g., sorbitol syrup, methyl cellulose or hydrogenated edible fats); emulsifying agent (e.g., lecithin or acacia); non-aqueous vehicles (e.g., almond oil, oily esters or ethyl alcohol); and preservatives (e.g., methyl or propyl p-hydroxy benzoates or sorbic acid).

Granulating techniques are well known in the pharmaceutical art for modifying starting powders or other particulate materials of an active ingredient. The powders are typically mixed with a binder material into larger permanent free-flowing agglomerates or granules referred to as a "granulation." For example, solvent-using "wet" granulation processes are generally characterized in that the powders are combined with a binder material and moistened with water or an organic solvent under conditions resulting in the formation of a wet granulated mass from which the solvent must then be evaporated.

Melt granulation involves the use of materials that are solid or semi-solid at room temperature (i.e., having a relatively low softening or melting point range) to promote granulation of powdered or other materials, essentially in the absence of added water or other liquid solvents. The low melting solids, when heated to a temperature in the melting point range, liquefy to act as a binder or granulating medium. The liquefied solid spreads itself over the surface of powdered materials with which it is contacted, and on cooling, forms a solid granulated mass in which the initial materials are bound together. The resulting melt granulation may then be provided to a tablet press or be encapsulated for preparing the oral dosage form. Melt granulation improves the dissolution rate and bioavailability of an active (i.e., drug) by forming a solid dispersion or solid solution.

The present invention also includes directly compressible wax-containing granules having improved flow properties. The granules are obtained when waxes are admixed in the melt with certain flow improving additives, followed by cooling and granulation of the admixture. In certain embodiments, only the wax itself melts in the melt combination of the wax(es) and additives(s), and in other cases both the wax(es) and the additives(s) melt.

The present invention also includes a multi-layer tablet comprising a layer providing for the delayed release of one or more compounds of the invention, and a further layer providing for the immediate release of a medication for treatment of G-protein receptor-related diseases or disorders. Using a wax/pH-sensitive polymer mix, a gastric insoluble composition may be obtained in which the active ingredient is entrapped, ensuring its delayed release.

Parenteral Administration

For parenteral administration, the compounds of the invention may be formulated for injection or infusion, for example, intravenous, intramuscular or subcutaneous injection or infusion, or for administration in a bolus dose and/or continuous infusion. Suspensions, solutions or emulsions in an oily or aqueous vehicle, optionally containing other formulatory agents such as suspending, stabilizing and/or dispersing agents may be used.

Controlled Release Formulations and Drug Delivery Systems

In one embodiment, the formulations of the present invention may be, but are not limited to, short-term, rapid-offset, as well as controlled, for example, sustained release, delayed release and pulsatile release formulations.

The term sustained release refers to a drug formulation that provides for gradual release of a drug over an extended period of time, and that may, although not necessarily, result in substantially constant blood levels of a drug over an extended time period. The period of time may be as long as a day, a week, or a month or more and should be a release which is longer that the same amount of agent administered in bolus form. The term delayed release is used herein in its conventional sense to refer to a drug formulation that provides for an initial release of the drug after some delay following drug administration and that mat, although not necessarily, includes a delay of from about 10 minutes up to about 12 hours.

For sustained release, the compounds may be formulated with a suitable polymer or hydrophobic material which provides sustained release properties to the compounds. As such, the compounds for use the method of the invention may be administered in the form of microparticles, for example, by injection or in the form of wafers or discs by implantation.

In one embodiment of the invention, the compounds of the invention are administered to a patient, alone or in combination with another pharmaceutical agent, using a sustained release formulation.

The term pulsatile release refers to a drug formulation that provides release of the drug in such a way as to produce pulsed plasma profiles of the drug after drug administration.

The term immediate release refers to a drug formulation that provides for release of the drug immediately after drug administration.

As used herein, short-term refers to any period of time up to and including about 8 hours, about 7 hours, about 6 hours, about 5 hours, about 4 hours, about 3 hours, about 2 hours, about 1 hour, about 40 minutes, about 20 minutes, or about 10 minutes and any or all whole or partial increments thereof after drug administration after drug administration.

As used herein, rapid-offset refers to any period of time up to and including about 8 hours, about 7 hours, about 6 hours, about 5 hours, about 4 hours, about 3 hours, about 2 hours, about 1 hour, about 40 minutes, about 20 minutes, or about 10 minutes, and any and all whole or partial increments thereof after drug administration. Those skilled in the art recognize, or are able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

EXPERIMENTAL EXAMPLES

The invention is now described with reference to the following Examples. These Examples are provided for the purpose of illustration only, and the invention is not limited to these Examples, but rather encompasses all variations that are evident as a result of the teachings provided herein.

Example 1: Synthesis of Compounds of Formula (1)

2-((5,5,8,8-tetramethyl-5,6,7,8-tetrahydronaphthalen-2-yl)amino)pyrimidine-5-carboxylic acid (4)
(Ohta, K. et al., Chemical & Pharmaceutical Bulletin, 2000, 48:1504-1513)

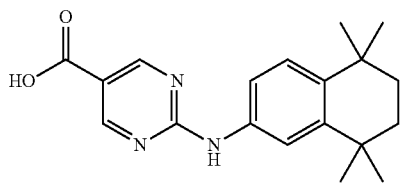

(4)

To a 100 mL round bottom flask charged with methyl 2-((5,5,8,8-tetramethyl-5,6,7,8-tetrahydronaphthalen-2-yl)amino)pyrimidine-5-carboxylate (0.5452 grams, 1.606 mmols) was added methanol (9.5 mL) followed by a solution of potassium hydroxide (0.2523 g, 4.497 mmol) in water (0.44 mL). A stir bar was then added to the flask, and the flask was placed in an oil bath set to 85° C. and stirred at reflux for 1.5 h. The product was precipitated by the addition of HCl (1N, 90 mL) and then filtered and dried overnight. The final product weighed 0.4965 g (95%): $^1$H NMR (400 MHz, d6-DMSO) δ 13.00 (s, 1H), 10.01 (s, 1H), 8.94 (s, 2H), 7.57-7.54 (m, 2H), 7.24 (m, 1H), 1.62 (s, 4H), 1.22 (s, 12H); $^{13}$C NMR (100.6 MHz, d6-DMSO) δ 165.4, 161.4, 159.7, 144.5, 139.1, 136.6, 126.4, 118.4, 118.1, 114.8, 34.7, 34.6, 34.0, 33.5, 31.7, 31.7.

6-((3,5,5,8,8-pentamethyl-5,6,7,8-tetrahydronaphthalen-2-yl)amino)nicotinic acid (7)

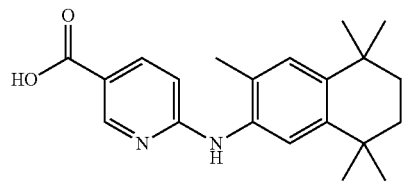

(7)

To a 100 mL round bottom flask charged with methyl 6-((3,5,5,8,8-pentamethyl-5,6,7,8-tetrahydronaphthalen-2-yl)amino)nicotinate (0.5415 g, 1.536 mmols) was added methanol (9 mL) followed by a solution of potassium hydroxide (0.2656 g, 4.734 mmol) in water (0.44 mL). A stir bar was then added to the flask, and the flask was placed in an oil bath set to 85° C. and stirred at reflux for 1.5 h. The product was precipitated by the addition of HCl (1N, 90 mL) and then filtered and dried overnight. The crude product weighed: 0.5513 g. This product was then run through a column packed with 150 ml of silica gel in a 10% ethyl acetate solution in hexanes. Once all of the product had been run through the column, TLC was run to confirm which fractions had product. These fractions were then consolidated and dried using a rotary evaporator. The final product was recovered as a crystalline solid (0.3052 g, 58.7%): $^1$H NMR (400 MHz, d6-DMSO) δ 12.90 (br s, 1H), 9.73 (br s, 1H), 8.47 (s, 1H), 8.04 (d, J=8.4, 1H), 7.25 (s, 1H), 7.24 (s, 1H), 2.18 (s, 3H), 1.63 (s, 4H), 1.25 (s, 6H), 1.20 (s, 6H).

2-fluoro-4-((3,5,5,8,8-pentamethyl-5,6,7,8-tetrahydronaphthalen-2-yl)amino)benzoic acid (10)

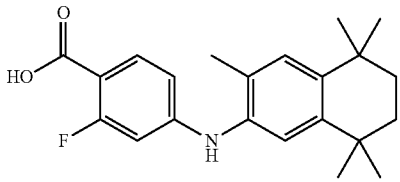

(10)

To a 100 mL round bottom flask charged with methyl 2-fluoro-4-((3,5,5,8,8-pentamethyl-5,6,7,8-tetrahydronaphthalen-2-yl)amino)benzoate (0.5530 g, 1.498 mmol) was added methanol (5 mL) followed by a solution of potassium hydroxide (0.2710 g, 4.83 mmol) in water (0.44 mL). A stir bar was then added to the flask, and the flask was placed in an oil bath set to 85° C. and stirred at reflux for 1.5 h. The product was precipitated by the addition of HCl (1N, 90 mL) and then filtered and dried overnight. The crude product was weighed: 0.5131 g. This product was then run through a column packed with 150 ml of silica gel in a 50% ethyl acetate solution in hexanes. The final product was a white, crystalline solid (0.4894 g, 91.9%): $^1$H NMR (400 MHz, d6-DMSO) δ 12.37 (br s, 1H), 8.34 (s, 1H), 7.65 (t, J=8.4, 1H), 7.20 (s, 1H), 7.09 (s, 1H), 6.50 (dd, J=8.4, 2.4, 1H), 6.32 (dd, J=14, 2.4, 1H), 2.10 (s, 3H), 1.61 (s, 4H), 1.23 (s, 6H), 1.19 (s, 6H); $^{13}$C NMR (100.6 MHz, d6-DMSO) δ 164.9, 164.9, 164.7, 162.1, 152.6, 152.5, 142.8, 141.2, 135.8, 133.6, 130.0, 128.9, 122.2, 108.8, 106.3, 106.2, 99.6, 99.4, 34.7, 34.5, 33.7, 33.5, 31.6, 31.6, 20.8, 17.4.

4-((3,5,5,8,8-pentamethyl-5,6,7,8-tetrahydronaphthalen-2-yl)amino)benzoic acid (15) (CAS No. 1028267-99-3)

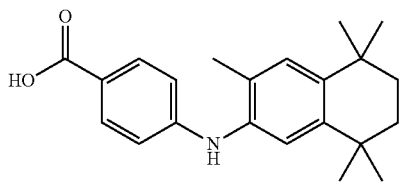

(15)

To a 100 mL round bottom flask charged with methyl 4-((3,5,5,8,8-pentamethyl-5,6,7,8-tetrahydronaphthalen-2-yl)amino)benzoate (0.4135 g, 1.176 mmol) was added methanol (5 mL) followed by a solution of potassium hydroxide (0.2149 g, 3.83 mmol) in water (0.38 mL). A stir bar was then added to the flask, and the flask was placed in an oil bath set to 85° C. and stirred at reflux for 1.5 h. The product was precipitated by the addition of HCl (1N, 90 mL) and then filtered and dried overnight. The crude product was weighed: 0.2853 g. This product was then run through a column packed with 150 ml of silica gel in a 50% ethyl acetate solution in hexanes. The final product weighed 0.1375 g (23%): $^1$H NMR (400 MHz, d6-DMSO) δ 12.16 (br s, 1H), 8.05 (s, 1H), 7.70 (d, J=9.2, 1H), 7.18 (s, 1H), 7.09 (s, 1H), 6.68 (d, J=8.4, 1H), 2.10 (s, 3H), 1.61 (s, 4H), 1.23 (s, 6H), 1.18 (s, 6H); $^{13}$C NMR (100.6 MHz, d6-DMSO) δ 167.7, 150.9, 143.1, 140.9, 136.9, 131.6, 130.1, 129.1, 122.0, 119.0, 113.0, 35.1, 35.0, 34.0, 33.9, 32.1, 32.0, 18.0.

6-((5,5,8,8-tetramethyl-5,6,7,8-tetrahydronaphthalen-2-yl)amino)nicotinic acid (3) (Takamatsu, K. et al., Chem. Med. Chem., 2008, 3:454-460)

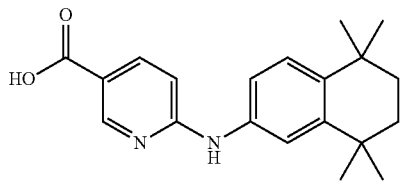

(3)

To a 100 mL round bottom flask charged with methyl 6-((5,5,8,8-tetramethyl-5,6,7,8-tetrahydronaphthalen-2-yl)amino)nicotinate (0.2093 g, 0.618 mmol) was added methanol (3.2 mL) followed by a solution of potassium hydroxide (0.1232 g, 2.196 mmol) in water (0.22 mL). This was left to dry overnight. The crude product was weighed to be 0.1789 g. A stir bar was then added to the flask, and the flask was placed in an oil bath set to 85° C. and stirred at reflux for 1.5 h. The product was precipitated by the addition of HCl (1N, 90 mL) and then filtered and dried overnight. This product was then run through a column packed with 150 ml of silica gel in a 50% ethyl acetate solution in hexanes to 1% methanol in ethyl acetate. The final product weighed 0.1318 g (65.7%): $^1$H NMR (400 MHz, d6-DMSO) δ 12.60 (br s, 1H), 9.42 (s, 1H), 8.65 (d, J=2.4, 1H), 7.94 (dd, J=8.8, 2.4, 1H), 7.53 (dd, J=8.4, 2.0, 1H), 7.42 (d, J=2.4, 1H), 7.23 (d, J=8.4, 1H), 6.78 (d, J=8.8, 1H), 1.62 (s, 4H), 1.23 (s, 6H), 1.21 (s, 6H); $^{13}$C NMR (100.6 MHz, d6-DMSO) δ 166.6, 158.5, 150.5, 144.6, 138.3, 137.7, 126.6, 117.8, 117.2, 116.1, 109.2, 34.7, 34.6, 33.9, 33.5, 31.7.

The synthesized compounds of formula (1) will be studied using a luciferase-based assay to determine retinoid-X-receptor (RXR) translational activity and the retinoid-acid-receptor (RAR) translational activity of the inventive compounds.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A compound of formula (3), or a pharmaceutically acceptable salt, solvate, hydrate or stereoisomer thereof:

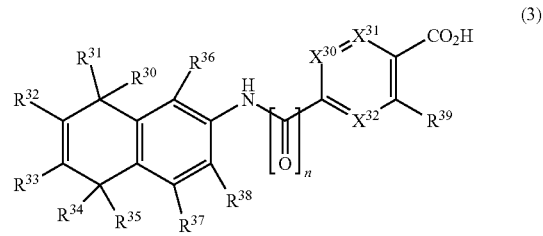

(3)

wherein $X^{30}$-$X^{32}$ are each independently N or $CR^{310}$, and at least one of $X^{30}$-$X^{32}$ is $CR^{310}$;

wherein $R^{30}$-$R^{38}$ are each independently hydrogen or —$C_1$-$C_6$ alkyl;

wherein $R^{39}$ and $R^{310}$ are each independently selected from the group consisting of: hydrogen, halogen, —OH, and —$CO_2H$; and wherein n is 0.

2. The compound of claim 1, wherein $R^{30}$, $R^{31}$, $R^{34}$, and $R^{35}$ are each independently methyl.

3. The compound of claim 1, wherein the compound is selected from the group consisting of:
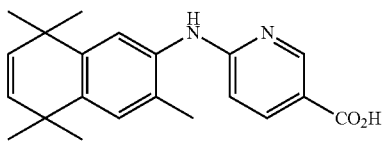
53
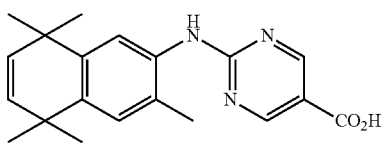
54
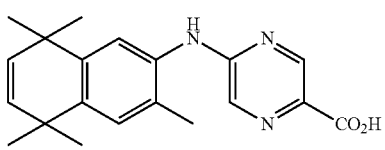
55
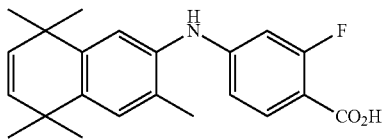
56
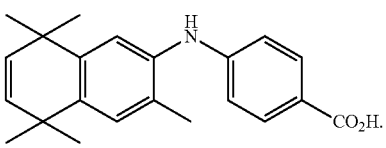
57
4. The compound of claim 1, wherein at least one of $X^{30}$-$X^{32}$ is N.
5. The compound of claim 1, wherein at least two of $X^{30}$ and $X^{32}$ are N.
* * * * *